United States Patent [19]
Schein et al.

[11] Patent Number: 6,075,575
[45] Date of Patent: Jun. 13, 2000

[54] REMOTE CONTROL DEVICE AND METHOD FOR USING TELEVISION SCHEDULE INFORMATION

[75] Inventors: Steven M. Schein, Menlo Park; James J. Leftwich, Palo Alto; David M. Folker, Fremont; Keith Hunwick, Mountain View; Theresa Alba; Molly K. King, both of Fremont, all of Calif.

[73] Assignee: StarSight Telecast, Inc., Fremont, Calif.

[21] Appl. No.: 08/847,731

[22] Filed: Apr. 28, 1997

Related U.S. Application Data

[63] Continuation-in-part of application No. 08/537,650, Oct. 2, 1995, abandoned.
[60] Provisional application No. 60/020,280, Jun. 17, 1996, abandoned.

[51] Int. Cl.$^7$ ........................................................ H04N 5/44
[52] U.S. Cl. ........................... 348/734; 348/569; 348/906; 345/146
[58] Field of Search .................................. 348/734, 569, 348/570, 563, 564, 906; 345/157, 167, 145, 146; 240/825.72, 825.69; H04N 7/16, 5/44

[56] References Cited

U.S. PATENT DOCUMENTS

| | | |
|---|---|---|
| 4,706,121 | 11/1987 | Young . |
| 4,745,402 | 5/1988 | Auerbach . |
| 4,754,268 | 6/1988 | Mori . |
| 4,787,051 | 11/1988 | Olson . |
| 4,924,216 | 5/1990 | Leung . |
| 5,097,260 | 3/1992 | Ahn ........................................ 348/734 |
| 5,142,655 | 8/1992 | Drumm . |
| 5,181,181 | 1/1993 | Glynn . |
| 5,313,282 | 5/1994 | Hayashi ................................. 348/734 |
| 5,325,423 | 6/1994 | Lewis . |
| 5,335,277 | 8/1994 | Harvey et al. . |
| 5,339,095 | 8/1994 | Redford . |
| 5,373,330 | 12/1994 | Levine .................................... 348/734 |
| 5,386,494 | 1/1995 | White . |
| 5,488,411 | 1/1996 | Lewis . |
| 5,532,754 | 7/1996 | Young et al. ........................... 348/569 |
| 5,589,893 | 12/1996 | Gaughan et al. ...................... 348/734 |
| 5,594,509 | 1/1997 | Florin et al. ........................... 348/731 |
| 5,603,078 | 2/1997 | Henderson et al. .................... 455/5.1 |
| 5,650,831 | 7/1997 | Farwell .................................. 348/734 |
| 5,657,414 | 8/1997 | Lett et al. ................................ 386/35 |

FOREIGN PATENT DOCUMENTS

| | | |
|---|---|---|
| 003906585A1 | 9/1990 | Germany ........................ H03J 9/00 |
| WO95/28055 | 10/1995 | WIPO . |
| WO95/32583 | 11/1995 | WIPO . |
| WO95/32585 | 11/1995 | WIPO . |
| WO96/09721 | 3/1996 | WIPO . |
| WO96/13935 | 5/1996 | WIPO . |
| WO96/17473 | 6/1996 | WIPO . |

OTHER PUBLICATIONS

Product Information for Panasonic Omnivision® PV–2501 Video Cassette Recorder, 2 pgs.

Leftwich et al., "*StarSight Interactive Television Program Guide—Functional/Interactional Architecture Specification Document, Interaction Analysis and Design Project—Phase III*", pp. 1 to K1 (36 pages).

StarSight Telecast, Inc., Brochure, "*Using StarSight 2*", 1994 (26 pages).

*Primary Examiner*—Michael H. Lee
*Attorney, Agent, or Firm*—Christie, Parker & Hale, LLP

[57] ABSTRACT

A remote control device 2 for navigating and interacting with a television schedule information system that is displayed, for example, on the viewer's television screen. The remote control device comprises a casing 4, a local controller 20 for scrolling a movable cursor 110 within an individual screen area or window on the television screen and a global controller 22 for moving the cursor between adjacent screen areas. The local controller includes a rolling cylinder 24 for vertical scrolling and a pair of buttons 32, 34 on either side of the cylinder for horizontal scrolling. The local and global controllers allow viewers to quickly and efficiently browse through the television guide, perform various actions, such as selecting or activating items, and interact with services related to the television programs without having to remove their eyes from the television.

22 Claims, 23 Drawing Sheets

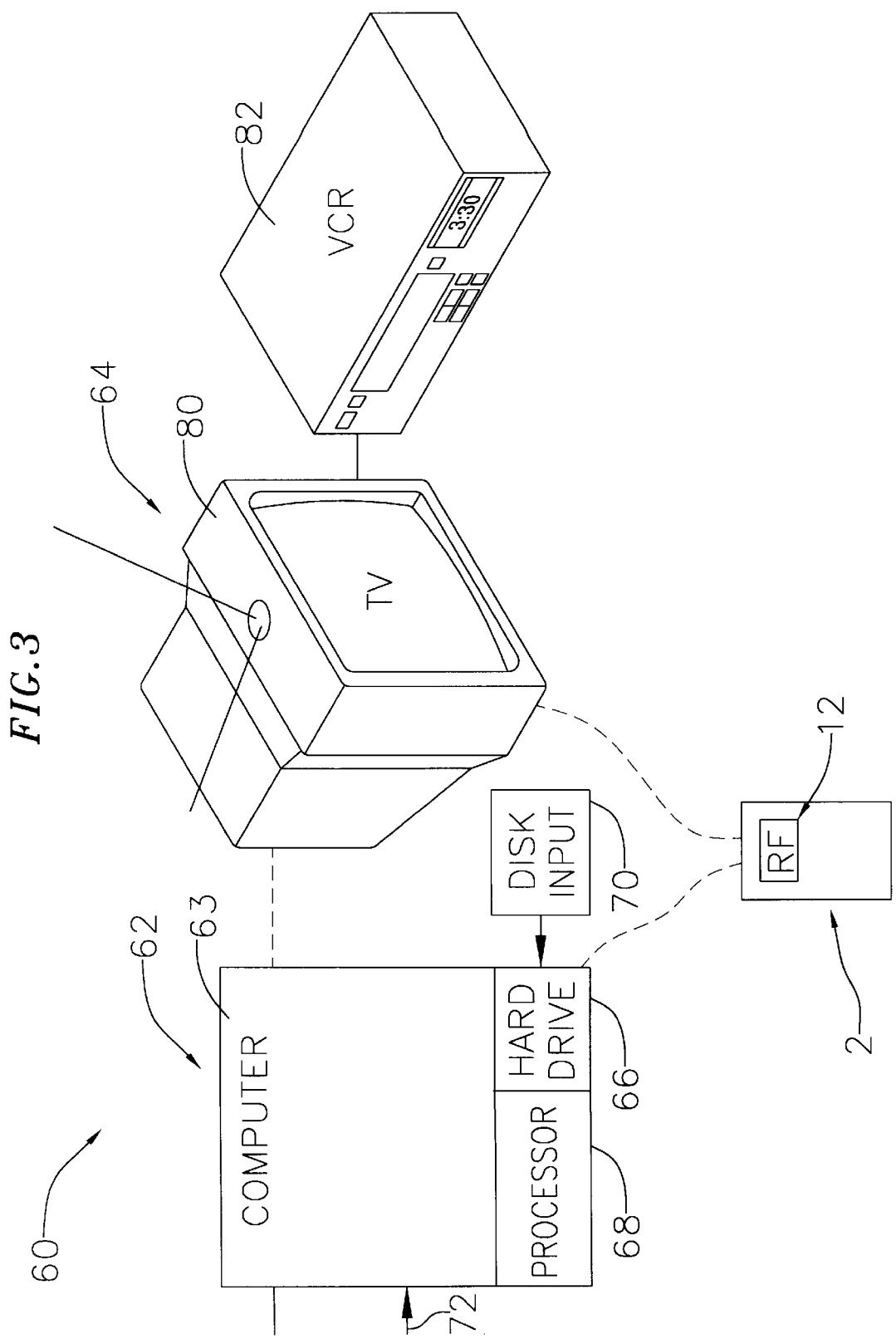

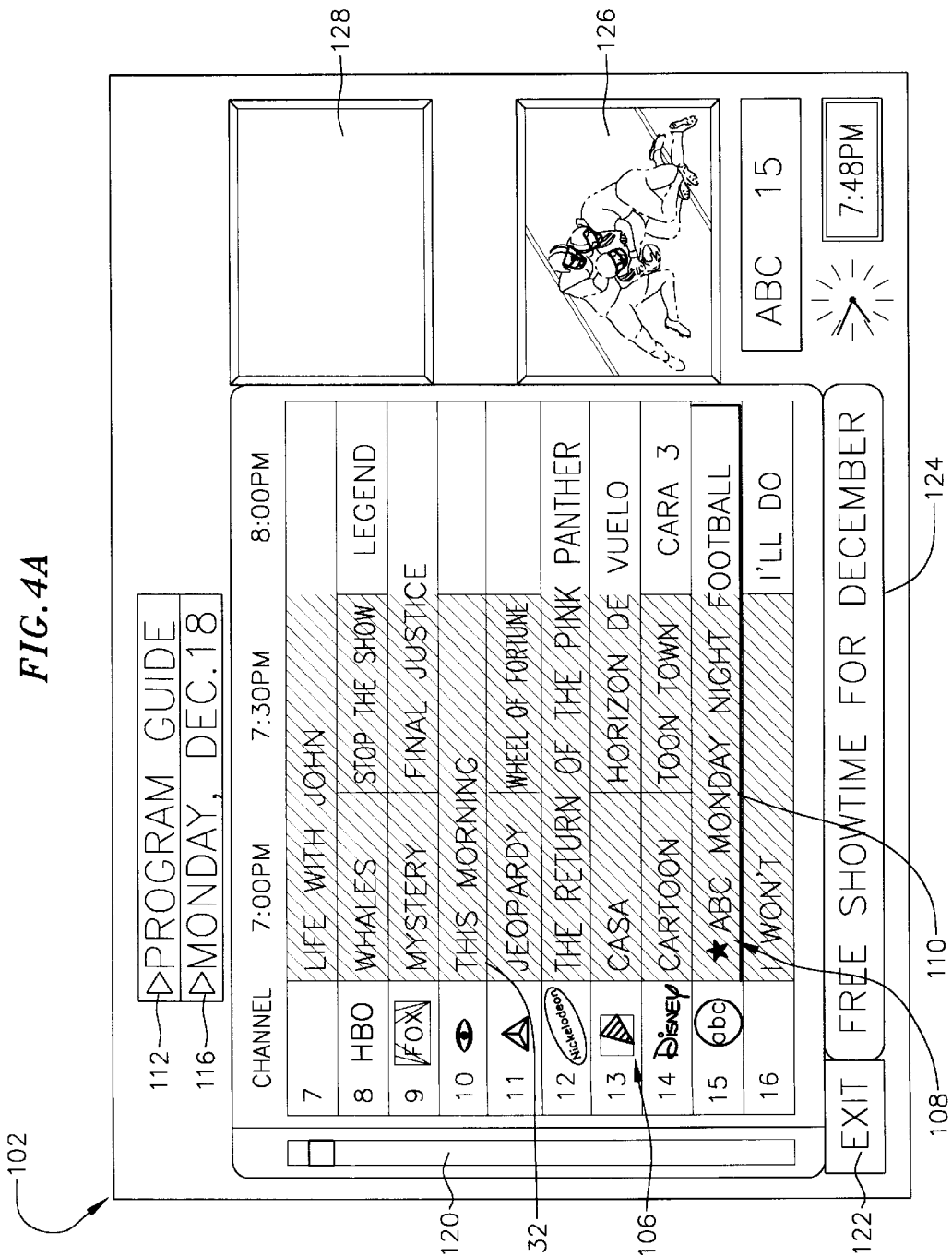

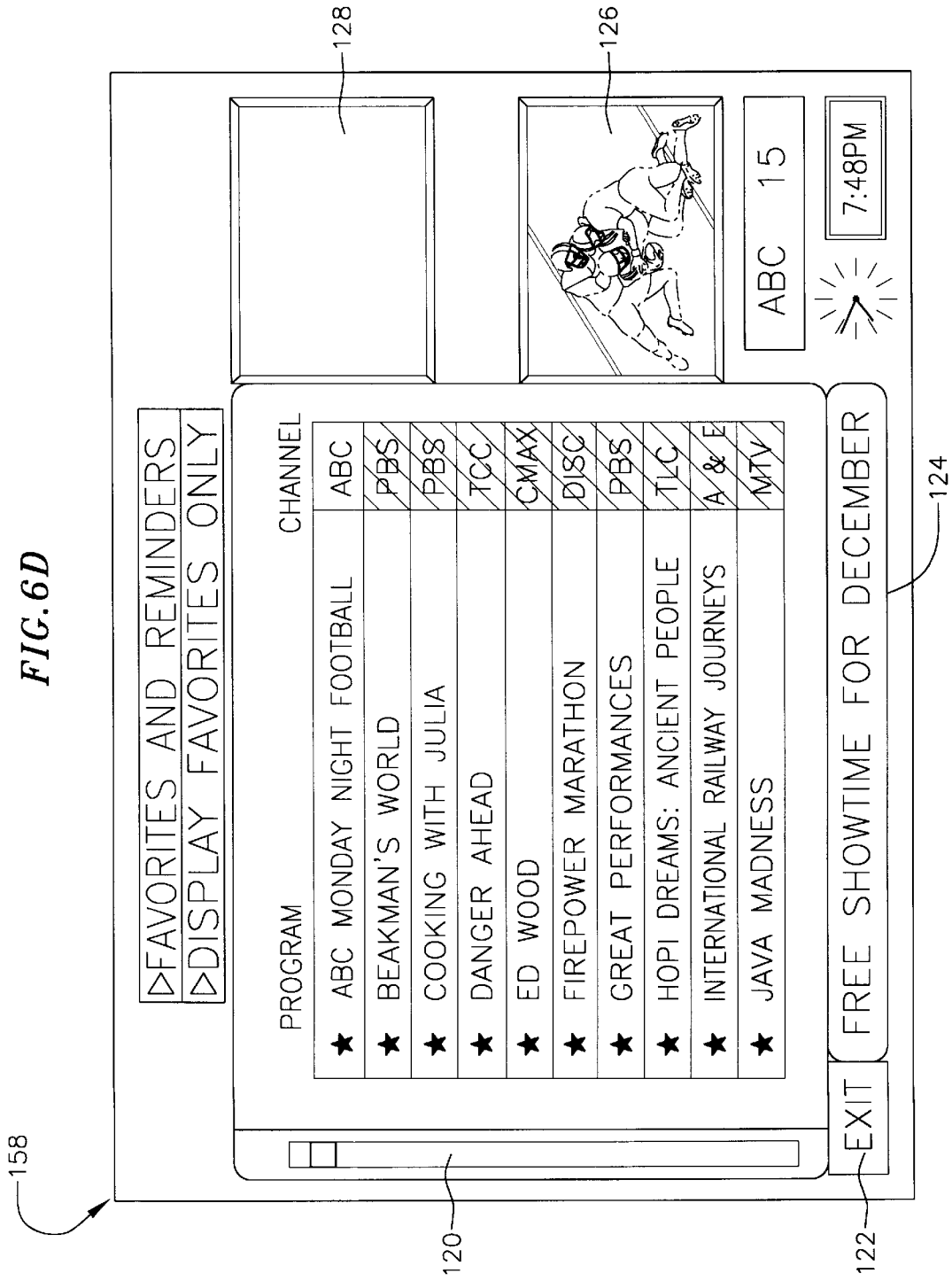

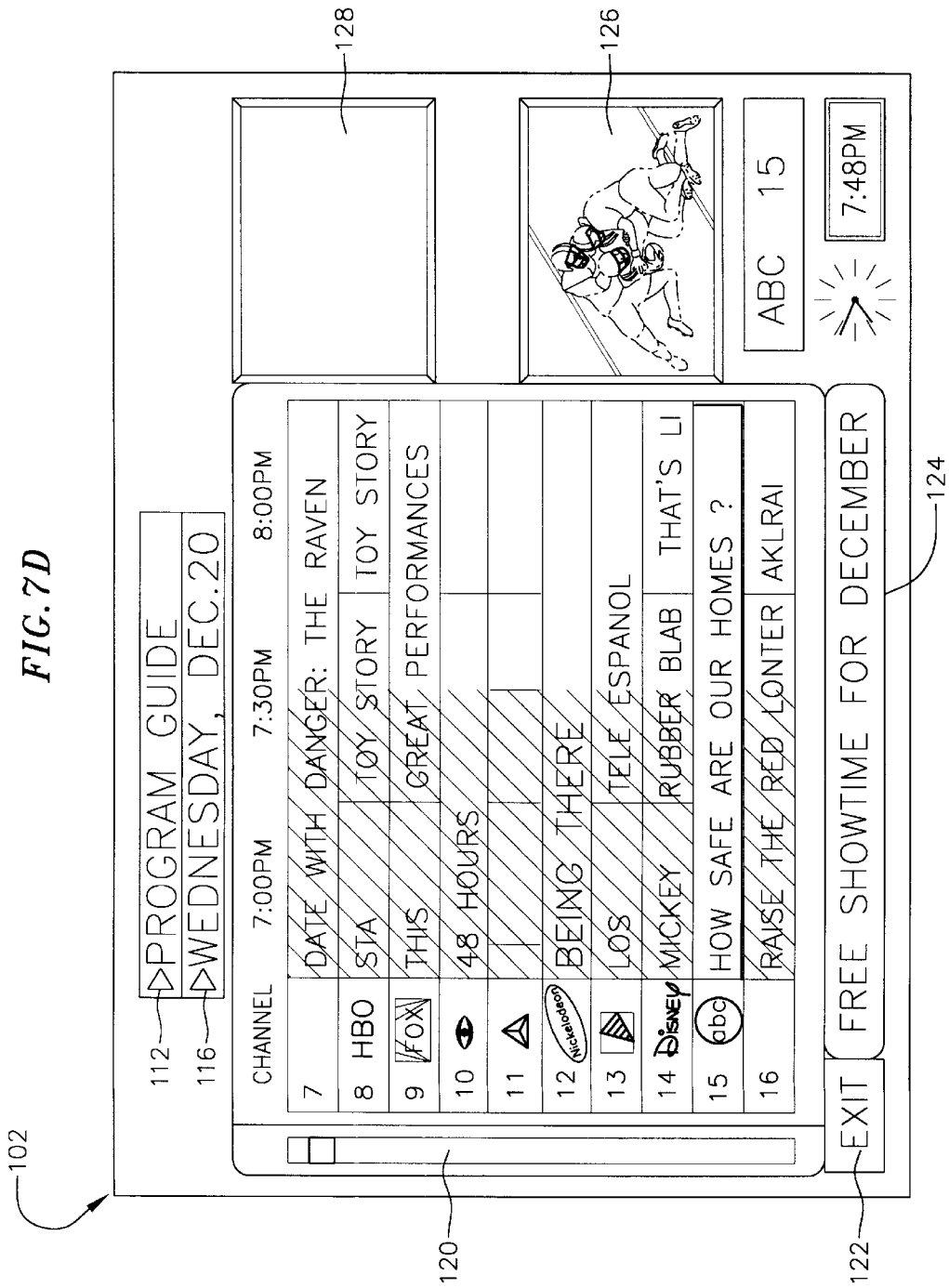

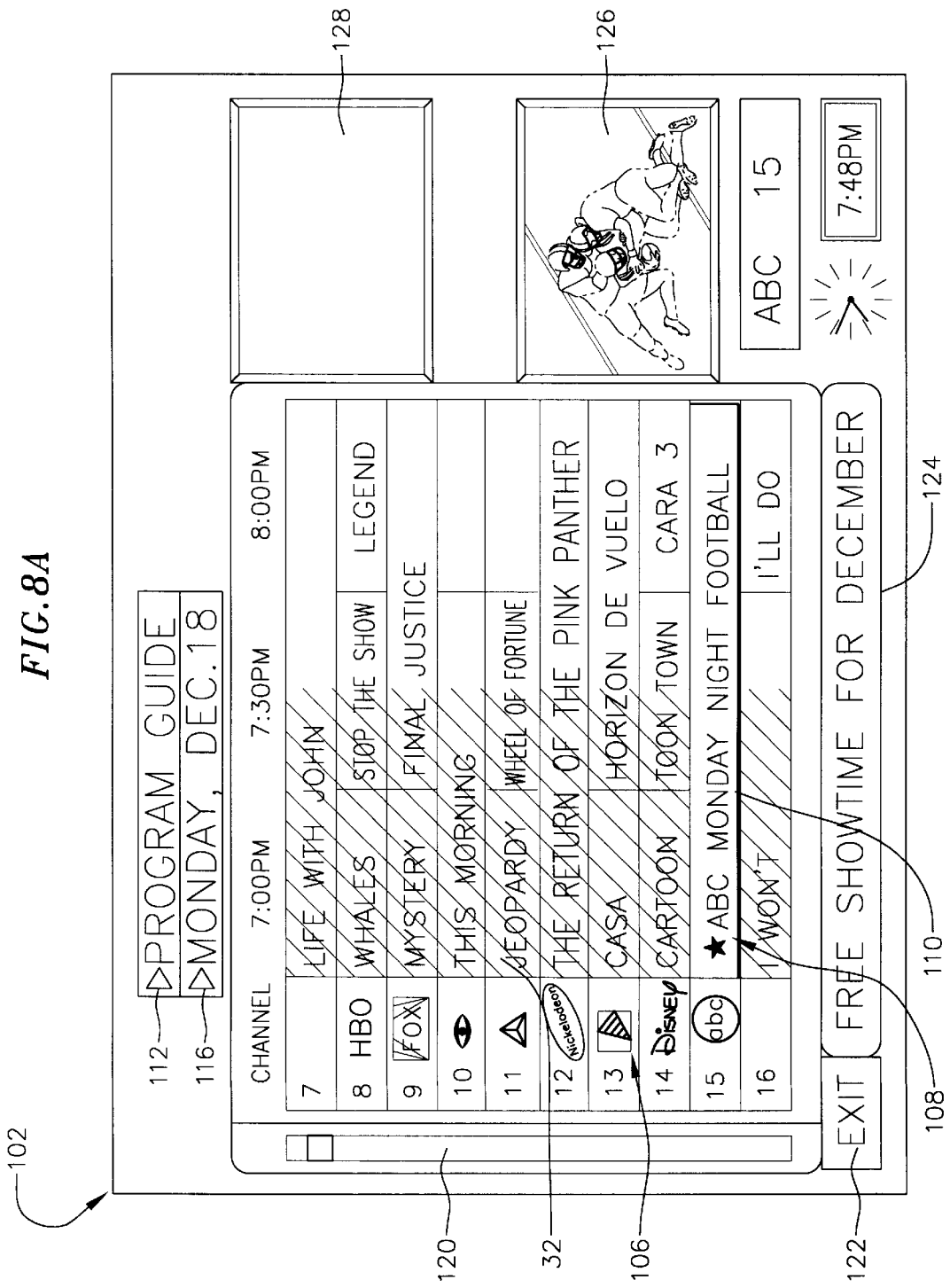

FIG.8C

```
ABC MONDAY NIGHT FOOTBALL
WASHINGTON REDSKINS AT MINNESOTA VIKINGS.
LIVE COMMENTARY BY FRANK GIFFORD AND
THE ABC CREW.
                    1 HOUR 18 MINUTES REMAINING
SPORTS: FOOTBALL
(1) MORE INFORMATION (2) RECORD ONCE
(3) RECORD DAILY
(4) RECORD WEEKLY
(C) BACK TO PREVIOUS MENU (0) GO BACK TO PROGRAM GUIDE
```

```
ABC MONDAY NIGHT FOOTBALL
WASHINGTON REDSKINS AT MINNESOTA VIKINGS.
LIVE COMMENTARY BY FRANK GIFFORD AND
THE ABC CREW.

THERE IS ROOM FOR SEVERAL ADDITIONAL LINES
OF DESCRIPTION INFORMATION

SPORTS: FOOTBALL
(1) MORE INFORMATION
(2) TUNE TO THIS CHANNEL
(0) GO BACK TO PROGRAM GUIDE
```

LEGENDS OF THE FALL
THREE SONS OF A RETIRED ARMY OFFICER RETURN FROM WORLD WAR 1 TO PURSUE VERY DIFFERENT LIVES.
ANTHONY HOPKINS, BRAD PITT, JULIA ORMOND
2 HOURS

MOVIES: DRAMA
(1) MORE INFORMATION (2) TUNE TO THIS CHANNEL NOW
(3) RECORD THIS PROGRAM
(4) PUT THIS PROGRAM ON MY FAVORITES LIST...
(5) REMIND ME WHEN THIS PROGRAM AIRS
(6) RESTRICT ACCESS TO THIS PROGRAM
(7) LINKED SERVICE (0) GO BACK TO PROGRAM GUIDE

130

FIG.9B (2) INDIVIDUAL PROGRAM
(3) SERIES AS A WHOLE
(4) PERFORMERS
(5) CATEGORY
(6) GO TO FAVORITES LIST
(C) BACK TO PREVIOUS MENU

155

FIG.9C (2) INDIVIDUAL MOVIE
(3) DIRECTOR
(4) PERFORMERS
(5) CATEGORY
(6) GO TO FAVORITES LIST
(C) BACK TO PREVIOUS MENU

DISPLAY ALL FAVORITES AND REMINDERS
DISPLAY FAVORITES ONLY
DISPLAY REMINDERS ONLY
CLEAR MY LIST OF FAVORITES
CLEAR MY LIST OF REMINDERS
SHOW OTHER USER

FIG. 11C

ENTERING PASSWORD
BY ENTERING YOUR PASSWORD YOU ARE CONFIRMING A PURCHASE OR VALIDATION OF YOUR ID. PLEASE ENTER YOUR PASSWORD TO ORDER THIS MOVIE FOR THE LISTED PURCHASE PRICE.

HELP: PASSWORD
(1) INFO ON (LEGENDS OF THE FALL)— $3.95

ENTER PASSWORD FOR DELIVERY IN 7 MINUTES
@7:55PM    (LEGENDS OF THE FALL)  $3.95
 ● ● ● ● ● ● ● ● ● ● ●
(2) ACCEPT PASSWORD...
(<) BACK TO PREVIOUS MENU (0) GO BACK TO PROGRAM GUIDE

FIG. 11D

CONFIRMING YOUR PURCHASE
YOU HAVE SUCCESSFULLY ENTERED YOUR PASSWORD. CLICKING ON "YES" ITEM WILL FINALIZE YOUR PURCHASE.

HELP: CONFIRMING YOUR PURCHASE
(1) INFO ON (LEGENDS OF THE FALL)    $3.95

YOU HAVE SUCCESSFULLY ENTERED YOUR PASSWORD. ARE YOU SURE YOU WANT TO PROCEED TO FINALIZE YOUR ORDER ?
(2) YES
(<) NO (BACK TO PREVIOUS MENU)

(0) GO BACK TO PROGRAM GUIDE

FIG. 11E

LEGENDS OF THE FALL
THREE SONS OF A RETIRED ARMY OFFICER RETURN FROM WORLD WAR 1 TO PURSUE VERY DIFFERENT LIVES.
ANTHONY HOPKINS, BRAD PITT, JULIA ORMOND
        VIDEO ON DEMAND PRICE—$3.95
MOVIES: DRAMA
(1) MORE INFORMATION

170

YOUR ORDER CONFIRMED !
12.15.95    OR.#950384383    IT.#345VODL
ACCOUNT 234.95430        PURCHASE: $3.95
(2) OK (BACK TO PREVIOUS MENU)
(3) GO TO YOUR LIST OF PURCHASES (0) GO BACK TO PROGRAM GUIDE

REMOTE CONTROL DEVICE AND METHOD FOR USING TELEVISION SCHEDULE INFORMATION

CROSS-REFERENCE TO RELATED APPLICATION

This application is a continuation-in-part of U.S. Provisional Patent Application Serial No. 60/020,280, filed on Jun. 17, 1996 now abandoned, and U.S. patent application Ser. No. 08/537,650, filed on Oct. 2, 1995 now abandoned, the complete disclosures of which are incorporated herein by reference. This application is also related to pending U.S. patent application Ser. No. 08/837,025, filed on Apr. 11, 1997, and its Appendices A, B, and C, of which are also incorporated herein by reference.

BACKGROUND OF THE INVENTION

The present invention generally relates to a system and method for remotely controlling a visual interface, and more particularly to a remote control device for navigating through and interacting with television schedule information on a television screen.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased. Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges. One such challenge is providing a system and method that allows the user to navigate through the various menus and submenus of the schedule guide and to interact with the various items contained therein. Ideally, the system and method would provide the viewer with the ability to quickly and efficiently browse through the television guide and/or perform various actions without having to remove his/her eyes from the television. In addition, it would be desirable to provide the viewer with the ability to interact with a wide range of services that are related to the programs in the television schedule.

SUMMARY OF THE INVENTION

The present invention provides a system and method for controlling information on a visual interface, such as a television screen, a computer monitor or the like. The present invention is particularly useful for allowing the viewing to navigate and interact with a television schedule information system that is displayed, for example, on the viewer's television screen.

The system of the present invention includes a remote control device comprising a casing, an input assembly on the exterior surface of the casing and a transmitter within the casing for receiving the viewer's input and transmitting associated signals to a television, VCR, computer or set top box, to control information presented on a television screen. The input assembly includes a variety of function buttons for performing functions, such as changing channels and controlling the volume, and a local controller for displacing a movable cursor on the television display. The local controller may comprise a cursor controller, pointing device or trackball that allows the user to freely move a cursor in all directions on the television screen. Alternatively, the local controller may comprise a scrolling device for moving the user through specific areas or windows on the screen with a cursor or other visual indication. For example, when the remote control device is used in combination with a television schedule system having a matrix of cells or a menu of items, the local controller enables the viewer to move or scroll the cursor through the cells or items. The cursor may be a physical icon on the screen, or it may be represented by highlighting or otherwise changing the background color of cells or items that are scrolled through by the viewer.

In a specific configuration, the local controller includes a vertical scroll mechanism for scrolling vertically through a column of items on the television screen and a horizontal scroll mechanism for scrolling horizontally through a row of items across the screen. The vertical scroll mechanism is preferably a rolling cylinder rotatably coupled to the casing. The rolling cylinder is configured so that viewers, while naturally holding the remote control device between their thumb and forefingers, can rotate the cylinder with their thumb to move the cursor up and down on the television screen. The horizontal scroll mechanism preferably comprises one or more buttons located on either side of the rolling cylinder and configured so that depressing the buttons moves the cursor to the right or left across the screen. The horizontal scroll buttons are preferably positioned adjacent the rolling cylinder so that viewers may easily access these buttons with their thumb, if desired.

The local controller further includes a selector switch for selecting an item, activating the item, or pulling down the item's associated menu onto the television screen. Preferably, the selector switch is the rolling cylinder. In this manner, viewers may vertically scroll down a menu and select an item without taking their thumb off the rolling cylinder. To move horizontally, the viewer simply moves his or her thumb to the left or right of the cylinder and presses on the horizontal scroll buttons. This elegant design allows the viewer to quickly and efficiently browse through the television guide, perform various actions, such as selecting or activating items, and interact with services related to the television programs without having to remove his/her eyes from the television.

In an exemplary configuration, the remote control device of the present invention further includes a global controller for navigating between different screen areas. In this configuration, the local controller is used to scroll through the cells or items within an individual screen area or window while the global controller globally moves the viewer to different windows on the television screen. In one embodiment, the global controller comprises an annular ring of one or more directional buttons surrounding the local controller. When a viewer wishes to move to an adjacent screen area, he or she simply presses the appropriate directional button. In another embodiment, the global controller is a trigger or clutch button on the remote casing. Pressing the clutch button switches the local controller into a different mode, where the rolling cylinder and horizontal scroll buttons can be used to move between different screen areas. This dual modality allows the viewer to both navigate between different windows and scroll and select items within an individual window with the same control device.

In another aspect of the invention, the remote control device includes a speech recognition input device, such as a microphone, for receiving spoken commands from the viewer and converting the spoken commands into audio signals and a transmitter within the casing for transmitting the audio signals from the viewer input to the television. This feature makes the device more efficient and viewer-friendly and may replace the local and global controller or other dedicated function buttons (i.e., channel and volume control buttons) on the remote control to allow hands-free control of the television and/or the television schedule system. In this embodiment, the television system includes a processor that includes speech recognition circuitry for receiving the audio signals and performing various tasks based on the spoken commands. The processor will typically be contained within a computer or separate set top box, but may also be contained within the remote control device or the television set. Alternatively, speech recognition software may be accessed and downloaded from, for example, a web site on the internet.

In another aspect of the invention, the remote control device includes a identification device for receiving input associated with a viewer's identification and converting this input into signals that are transmitted to the television, VCR, computer, set top box or the like. In one embodiment, the identification device includes a slot on the exterior surface of the case for receiving a credit card or other identification card, and a recognition device for reading a code on the credit card and converting this information into signals representing the viewer's identification. This feature of the present invention facilitates the versatility of the remote control device by allowing the viewer to directly purchase products or services through the television schedule system.

BRIEF DESCRIPTION OF THE DRAWINGS

FIG. 3 is a schematic view of a representative computer system coupled to a television system incorporating the remote control device of the present invention.

FIGS. 4A and 4B are schematic views of a representative program guide and a channel guide, respectively, for use with the remote control device of FIG. 1 in a television schedule system.

FIGS. 6A–6D illustrate a method for navigating from the program guide to a mode menu and selecting a different mode.

FIGS. 7A–7D illustrate a method for navigating from the program guide to a submode menu and selecting a different submode.

FIGS. 8A–8D illustrate a method for opening an information menu, scrolling down to other options and opening an information submenu.

FIGS. 9A–9F illustrate a method for selecting a favorite item.

FIGS. 11A–11E illustrate a Video On Demand menu and an associated submode menu.

DESCRIPTION OF THE SPECIFIC EMBODIMENTS

The present invention provides a remote control device that can be used to control information on a variety of visual interfaces, such as televisions screens, computer monitors and the like. The remote control device of the present invention is particularly useful for allowing the viewing to navigate and interact with a television schedule information system that is displayed, for example, on the viewer's television screen. Suitable television schedule systems or video guides that can be used with the present invention are described in commonly assigned U.S. Pat. Nos. 5,353,121, 5,479,266, the complete disclosures of which are hereby incorporated by reference. The remote control device may also be useful with video guides available under the name of SuperGuide™ from The SuperGuide Corporation of Shelby, N.C.

The remote control device of the present invention will include a housing or casing and an input assembly on the exterior surface of the casing. The casing will usually resemble the generally rectangular shape of typical television remote control devices. However, the casing may also be similar to other conventional input devices, such as a mouse, a joystick, a computer keyboard, etc., or the casing may have a specialized, non-conventional shape. The casing will include a controller for allowing the television viewer to move along the television screen either freely or through specific areas or windows on the screen. The controller may comprise a trackball, cursor controller, pointing device, a microphone for allowing voice activation, a number of keys or buttons that function to move the user around the screen, or the like. In the preferred embodiment, the controller comprises a scrolling mechanism for displacing a movable cursor through a matrix of cells or windows on the screen. The cursor may comprise a physical icon on the screen, or it may be represented by highlighting or other visual indications of the cells or windows that are scrolled through by the viewer.

Figure 1:
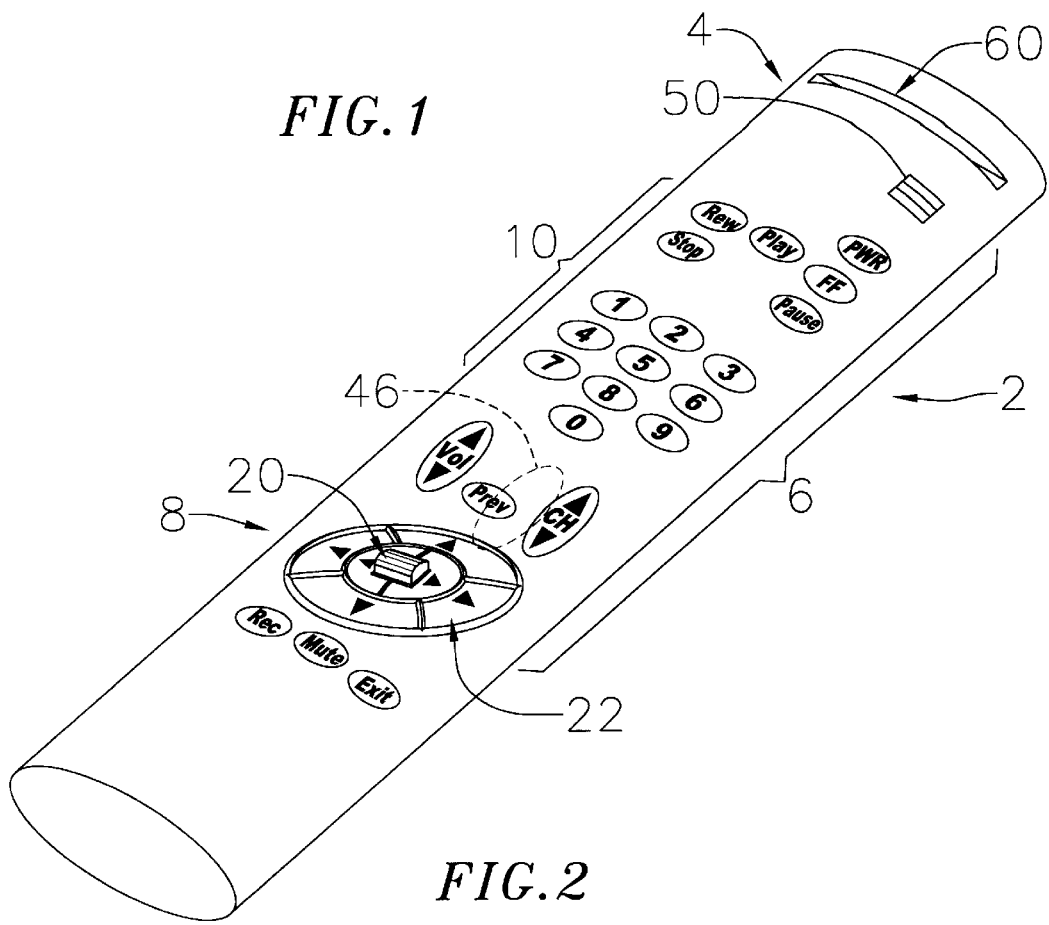
FIG. 1 is a perspective view of a remote control device according to the principles of the present invention.

Referring to the drawings in detail, wherein like elements are indicated by like numerals, an exemplary remote control device 2 for facilitating the use of television schedule information is illustrated according to the present invention. As shown in FIG. 1, remote control device 2 generally comprises a casing 4 having a viewer input assembly 6 for controlling a television, computer or VCR and for utilizing television schedule information on a television screen, as discussed below. Input assembly 6 generally includes a cursor control assembly 8 for displacing a cursor on a display screen, such as a television screen, and a plurality of dedicated function buttons 10 for performing various functions, such as changing channels, operating a VCR, changing the volume, etc. In addition, dedicated function buttons 10 may be used for other interactions requiring numeric input, such as inputting security codes, credit card numbers, etc.

As shown in FIG. 3, remote control device 2 further includes an RF transmitter 12 for transmitting signals generated by the viewer through viewer input assembly 6 to, for example, a processor within a personal computer, a television or a VCR. RF transmitter 12 may be substituted with, for example, IR emitters, modulated light signals (i.e., a signal sent to optical fiber), or even a hardware connection. Remote control device 2 will also include a power source, such as a battery (not shown).

Figure 2:
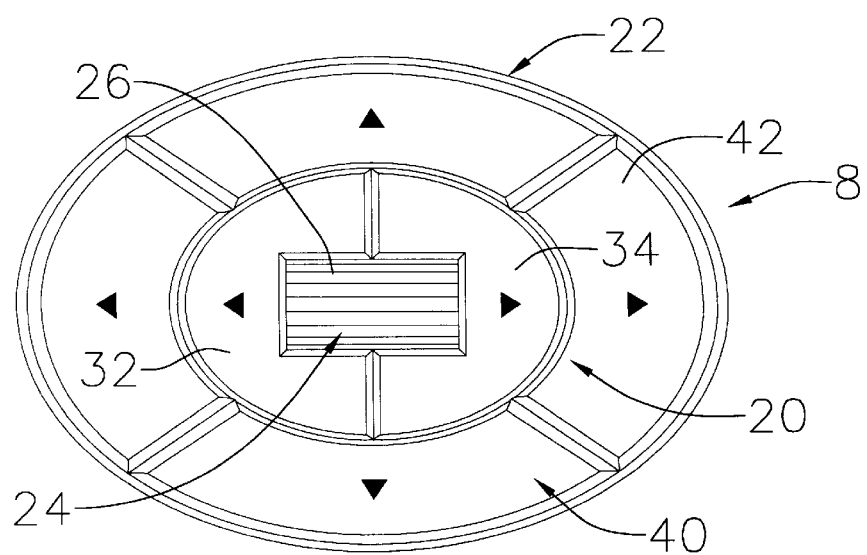
FIG. 2 is an enlarged view of local and global controllers of the remote control device of FIG. 1.

Referring to FIG. 2, the cursor control assembly 8 of the present invention will now be described in detail. Cursor control assembly 8 includes a local controller 20 for moving the cursor within a designated screen area or window on the display screen and a global controller 22 for navigating among different windows on the display screen, as discussed in further detail below. Local controller 20 comprises a vertical scroll mechanism for scrolling cursor in the y-direction or vertically through an individual window or menu. The vertical scroll mechanism is preferably a rolling cylinder 24 rotatably mounted to casing 4 around an axis perpendicular to the longitudinal axis of casing 4. Rotation of cylinder 24 moves the cursor vertically through the window or menu of the display screen. In a preferred embodiment, the window will be made up of at least a vertical column of cells and cylinder button 24 will move the cursor up and down the column. Rolling cylinder 24 preferably includes means for providing tactile feedback to the viewer so that cylinder 24 to facilitate operation of cylinder 24 without looking at remote control device 2 (i.e., so the viewer can look at the television screen). In the preferred configuration, cylinder 24 includes a plurality of detents or ridges 26 or its outer surface that indicate to the viewer, either by tactile feel or by sound, that the cursor is moving through each cell in the window or menu.

Local controller 20 further includes a horizontal scroll mechanism for moving the cursor in an "x" direction or horizontally across the display screen. As shown in FIG. 2, the horizontal scroll mechanism preferably includes first and second buttons 32, 34 located on either side of rolling cylinder 24. Depressing buttons 32, 34 moves the cursor left or right across a row of items in an individual window of the display screen. Preferably, the viewer will be required to press one of the buttons 32, 34 for each item the cursor moves through in the horizontal direction. However, it should be noted that the invention is not limited to this configuration and buttons 32, 34 can be configured so that continuous depression of one button 32, 34 moves the cursor horizontally through a plurality of items. Alternatively, cylinder 24 may be configured for horizontal movement so that both horizontal and vertical movement can be carried out with a single button.

Cursor control assembly 8 further includes a selector switch for selecting an item on the display screen when the cursor is contiguous with that item. In a specific configuration, the selector switch is rolling cylinder 24. Depression of cylinder 24 will select or activate the item or pull down a menu associated with that item. This feature of the present invention allows viewers to both vertically scroll through items in a menu and select these items without moving their thumb from cylinder 24.

Global controller 22 preferably comprises a screen navigation ring 40 having a plurality of direction buttons 42 surrounding local controller 20. The exact number of direction buttons 42 in navigation ring 40 will typically depend on the number and relative locations of the different information areas on the display screen. In a specific configuration, global controller 22 will include four buttons 42 controlling left, right, up and down movement of the cursor along the television screen.

As an alternative to navigation ring 40, remote control device 2 may include a trigger or clutch button 46, as shown in FIG. 1. Clutch button 46 can be depressed to provide dual modality for local controller 20. Specifically, pressing clutch button 46 will move local controller 22 between a first mode, where cylinder 24 and horizontal scroll mechanism 30 move the cursor between different items within a particular information area on the display screen, and a second mode, where cylinder 24 and horizontal scroll mechanism 30 move the cursor between different information areas on the screen. Clutch button 46 is preferably located on the back side of casing 4 so that the viewer can easily depress button 46 with his or her fingers when holding the device.

Referring again to FIG. 1, viewer input assembly 6 of remote control device 2 further includes a voice recognition device for receiving spoken commands from the viewer and converting the spoken commands into signals to facilitate use of television schedule information. Typically, the voice recognition device will include a microphone 50 on remote control device 2 for receiving the spoken commands and converting them into audio signals and a microprocessor (not shown) that includes speech recognition circuitry contained therein for receiving the audio signals and performing various tasks based on the spoken commands. The microprocessor may be contained within the remote control device or within a television set, a computer, VCR or the like. Alternatively, the speech recognition circuitry may be accessed from another computer or a datastream of information, such as a web site on the internet, and downloaded into the television schedule system.

The voice recognition device of the present invention may further include a trigger button (not shown) on remote control device 2 for activating or deactivating microphone 50. This allows the viewer to speak to other people in the room without accidentally triggering commands through microphone 50. The trigger button is normally in the up position, which corresponds to microphone 50 being in the deactivated state. When the viewer wishes to input a spoken command, message or data to the VCR, television or computer, the viewer must depress button 52 which causes a signal to be sent to a processor (not shown) to activate microphone 50. Once microphone 50 is activated, it will input the received audio signals (e.g., spoken commands) to the processor.

Remote control device 2 further includes a mechanism for inputting and recognizing a viewer's identification (i.e., credit card number, social security number, etc.) for authorizing the viewer to purchase products or services from the television schedule system. In a preferred configuration, the identification mechanism is a slot 60 in casing 4 sized for receiving a credit card, data card, security card or other viewer identification card, as shown in FIG. 1. In this configuration, remote control device 2 includes a recognition device for reading a code on the credit card when the credit card is swiped through slot 60. A process will convert the credit card's code into signals representing the viewer's identification. Alternatively, the identification mechanism may comprise numeric or symbolic keys on casing 4, such as the numeric keys shown in FIG. 1. In this embodiment, the numeric keys may be used to input a security code, such as a credit card number, social security number or the like.

FIG. 3 illustrates a representative television schedule system 60 for use with remote control device 2 of the present invention. As shown, system 60 includes a computer system 62 coupled to a television system 64. In the preferred embodiment, computer system 62 includes a standard computer 63 which is, for example, any personal computer, (e.g., IBM compatible, MacIntosh and the like). Computer 63 can also be located within a set top box (e.g., a DSS box), or the computer may be located remote from the user's home, e.g., an external server or host computer. In the latter embodiment, the television schedule system 60 will be capable of accessing and downloading an application or applet from the computer through, e.g., the internet or other communication media. The computer contains a hard drive 66 and a processor 68. These units are usually automatically included in the computer 63. A disk input 70 is used to provide the computer 63 with various additional software. A data line 72 is connected to an available serial, parallel or other data port on the computer 63. This line 72 is used to connect other devices/components to computer.

In another embodiment, computer system 62 may be combined with television system 60 to form a PCTV. In this embodiment, the computer will usually include a processor that may be used solely to run the program guide and associated software, or the processor may be configured to run other applications, such as word processing, graphics, or the like. The computer will usually be incorporated into the television set so that the television display can be used as both a television screen and a computer monitor. Usually, the PCTV will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

Television system 64 includes a television 80 which may be any commercially available television. Television system 64 may or may not include a videotape recorder (VCR). In this embodiment, a VCR 82 is coupled to television. This VCR can be, for example, any commercially available VCR or any other type of recording device (analog or digital). Computer 63 and television 80 can be directly connected by a line 84 or remotely connected so that computer 63 and television 80 can be located in different rooms within a private residence or commercial building. In the preferred embodiment, a computer program provided on diskettes, CD Rom or other medium contains the software needed for receiving, organizing and displaying data for a television schedule guide (see FIGS. 4–11). These diskettes are inserted into disk input 70 and the software for these diskettes is stored within the computer 63 on the hard drive or on another mass storage location. This action can be performed by, for example, the viewer or service person. The computer program can also be provided, for example, via downloading from a satellite, transmission through the internet or other on-line service, or transmission through another type of land line. A more detailed description of a preferred computer system for use with the present invention is described in commonly assigned, co-pending U.S. patent application Ser. No. 08/537,650, filed Oct. 2, 1995 now abandoned, the complete disclosure of which is hereby incorporated by reference.

In another embodiment, computer system 62 may be combined with television system 60 to form a PCTV. In this embodiment, the computer will usually include a processor that may be used solely to run the program guide and associated software, or the processor may be configured to run other applications, such as word processing, graphics, or the like. The computer will usually be incorporated into the television set so that the television display can be used as both a television screen and a computer monitor. Usually, the PCTV will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

In this embodiment, remote control device 2 will send input to computer 60, which then transmits signals, via an appropriate RF transmitter or the like (not shown), to television system 64. The data for the television schedule system can be obtained from a variety of databases. For example, on-line providers (Prodigy, America On Line, Compuserve, MSN, At&T, etc) may provide access to a database which contains the television schedule information. These on-line information providers can transmit data to television 80. To accomplish this, television 80 or computer 63 will include a modem, which can be connected to a telephone line, cable modem, ISDN line, DSS channel or the like, and software for searching and providing the data to computer 63.

FIGS. 4–11 illustrate a sample television schedule system with a grid guide, and methods for utilizing the television schedule system with remote control device 2 of the present invention. In Appendix A, which is attached to co-pending U.S. patent application Ser. No. 08/837,025, filed Apr. 11, 1997, of which has been incorporated by reference, entitled "Using Starsight 2", that further illustrates the representative television program guide. Of course, it should be recognized that the invention is not limited to the specific television schedule system shown in FIGS. 4–11. For example, Appendix B, which is also attached to co-pending U.S. patent application Ser. No. 08/837,025, filed Apr. 11, 1997, of which has been incorporated by reference, entitled "Starsight Interactive Television Program Guide, Phase III", illustrates another television program guide according to the present invention. Device 2 is particularly advantageous with either of these systems as it enables the viewer, via remote control device 2, to rapidly and easily scroll throughout a grid guide to obtain information and to interact with the systems.

Figure 4B:
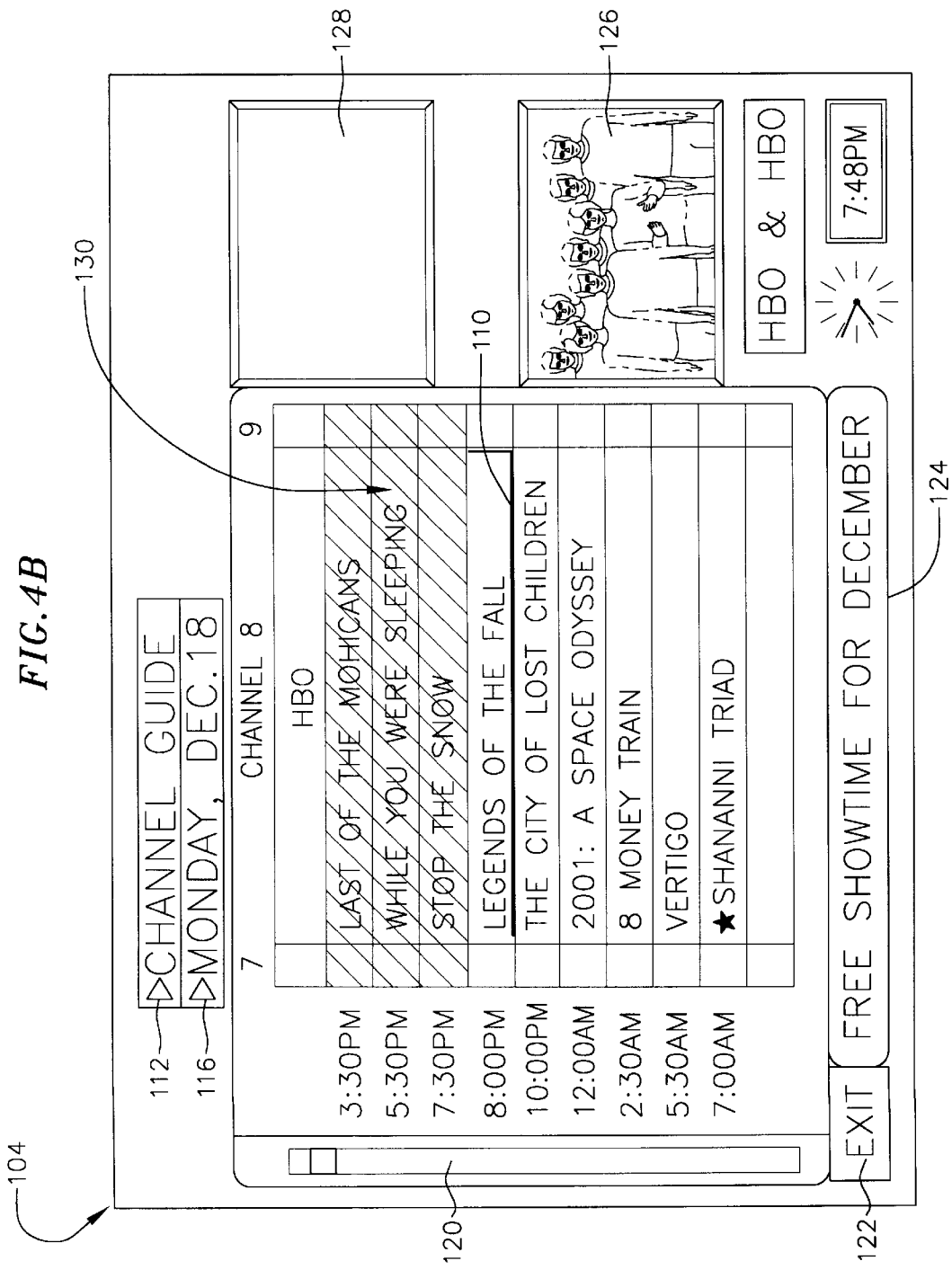

FIGS. 4A and 4B illustrate a program guide 102 and a channel guide 104, respectively, for the television schedule system of the present invention. The program guide 102, which is the primary mode in the television schedule system, includes a number of screen information areas or windows in a particular screen where the viewer operates local controller 20 to move around vertically and horizontally and to interact with that screen area's function. Preferably, the currently active screen area will be indicated to the viewer, for example, by changing the background color from a light greyscale metallic to a brighter, active color. Within each screen area are one or more items, typically arranged in a matrix or grid so that the viewer can scroll through the grid with local controller 20. The thumb-operated rolling cylinder 24 allows for efficient vertical movement through long lists of items within a screen area. The items can be selected or activated by clicking once on rolling cylinder 24. Activation of an item will invoke a Submenu, a Dialog, a Panel, invoke an action or the like. In an exemplary configuration, device 2 is configured so that double clicking on cylinder 24 will invoke an item's associated menu or Submenu and automatically activate the default menu item. In addition, device 2 may include further shortcuts, such as mediated signals that are accomplished by simultaneously holding in clutch button 46 and cylinder 24.

The viewer navigates between the screen areas with global controller 22 or with local controller 20 in the second modality (i.e., when clutch button 46 is in use). As shown in FIG. 4A, program guide 102 preferably includes a schedule information area 106 having a program matrix 108 of cells or items that depict the shows that are being presented on each channel at each time during the day. Program guide 102 conveniently lists the channels in a vertical column to the left of the program matrix 108 and the times in a horizontal row above matrix 108. As shown, the viewer may vertically scroll through a particular time with rolling cylinder 24 or horizontally scroll through a channel with buttons 32, 34. As the viewer scrolls through matrix 108, a cursor 110 will indicate the user's location within the matrix 108. Alternatively, the item may be automatically highlighted with a brighter color to indicate the viewer's location. Preferably, program matrix 108 will also be shaded to indicate the portion of each show that has already been presented. For example, as shown in FIG. 4A, the shading extends to 7:48 (the current time as indicated at the bottom right of program guide 102) to indicate which portion of the show the viewer has already missed.

As shown in FIG. 4A, program guide 102 includes a number of other information areas. For example, program guide 102 includes a mode menu area 112 that indicates the currently active mode (i.e., program guide 102) and allows the viewer to pull down a mode menu 114 (see FIG. 6B). Program guide 102 also includes a date area 116 that indicates the date reflected in program matrix 106 and allows the viewer to pull down a date submenu 118 (see FIG. 7B) to change the date. In other submodes, the submode menu will display options for ordering or displaying lists that are appropriately related to the submode. A proportional scroll bar 120 located to the left of program matrix 106 is visually proportional to the total information in program matrix 106 to provide visual feedback as the user vertically scrolls through matrix 106. In addition, scroll bar 120 may be used for large-scale movement through hundreds of channels/sources by navigating to bar 120 with global controller buttons 42 and then vertically moving bar 120 by depressing cylinder 24 and rotating it upwards or downwards. An exit area 122 allows the viewer to immediately exit back to the television by navigating to exit area 122 with global controller 22 and clicking on cylinder 24. A program area 126 depicts the currently tuned program and a preview window area 128 can be used for all types of promotional, descriptional, or contextual video or graphics, such as a short preview of the show that is currently being highlighted in show matrix 106. Preview window area 128 may also be interactional similar to the other areas of guide 102.

In an exemplary configuration, program area 126 displays the currently tuned program "live" so that the viewer can browse through program matrix 106 without missing the action on the currently tuned program. This feature allows the user, for example, to keep track of the score of a football game while browsing through the program matrix or performing other interactions with the system, such as purchasing goods or services, searching for more information on a program, etc. In another configuration, the viewer may set program area 126 to change as the viewer browses through program matrix 106 so that area 126 depicts the highlighted program in the matrix. This allows the television viewer to quickly view each program without exiting from the program guide 102.

The program guide may also include a variety of additional areas to facilitate use of the television schedule system, present information to the viewer or advertise programs or other products. For example, a scrolling commercial message 124 may be located underneath program matrix 106 that advertises programs or products from program sponsors, etc. The viewer may navigate to message 124 and click on cylinder 24 to receive more information or to purchase the product or program. A two second delay or click of cylinder 24 will open the scrolling message up into its info menu (not shown). This function of ordering items is not limited to videos. For example, the program may access other contextual linked services such as a commercial store, etc., to allow the purchaser to buy a wide variety of different services or goods directly or indirectly linked to a particular program. For example, an Info Menu for Monday Night Football may allow the viewer to scroll through submenus that allow the viewer to purchase Washington Redskins' caps, Minnesota Vikings' caps or any NFL cap. The viewer has a choice to follow a program's link back to the commercial area where a larger selection of items and services are available. A product like the cap above may lead the viewer directly to an NFL proshop, whereas a link to a movie on demand may lead back to a commercial film library. A more complete description of a television schedule system incorporating contextual linked services is described in co-pending, commonly assigned U.S. patent application Ser. No. 08/837,025, filed on Apr. 11, 1997, to Schein et al., and its Appendices A, B, and C, the complete disclosure of which have been incorporated by reference.

FIG. 4B illustrates the television schedule system of the present invention in the channel guide mode. As shown, channel guide 104 is similar to program guide 102 except that it includes an information screen area 130 that is reversed from the information screen area 106 in the program guide. Thus, the viewer can scroll vertically to move forward and backward in time along one channel and horizontally to move from channel to channel.

Figure 5A:
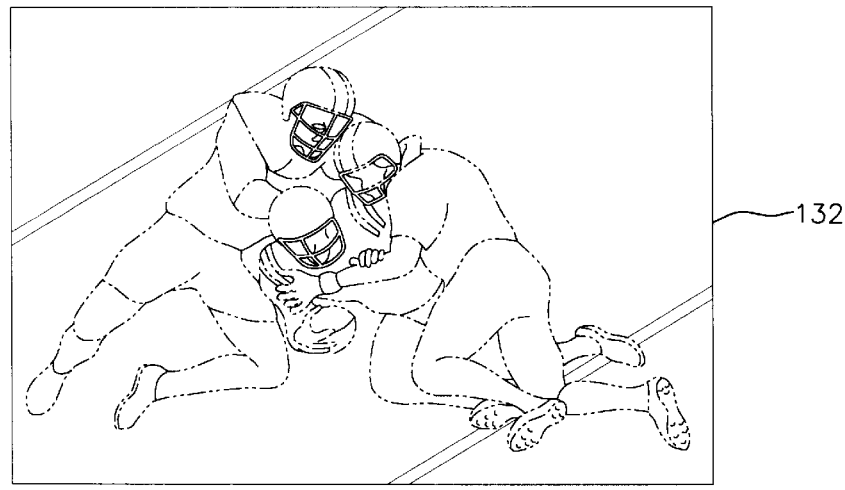
FIGS. 5A–5C are schematic views illustrating a method for selecting a program information menu, moving to the program guide of FIG. 4A and browsing through information menus from other programs with the remote control device of FIG. 1.
Figure 5B:
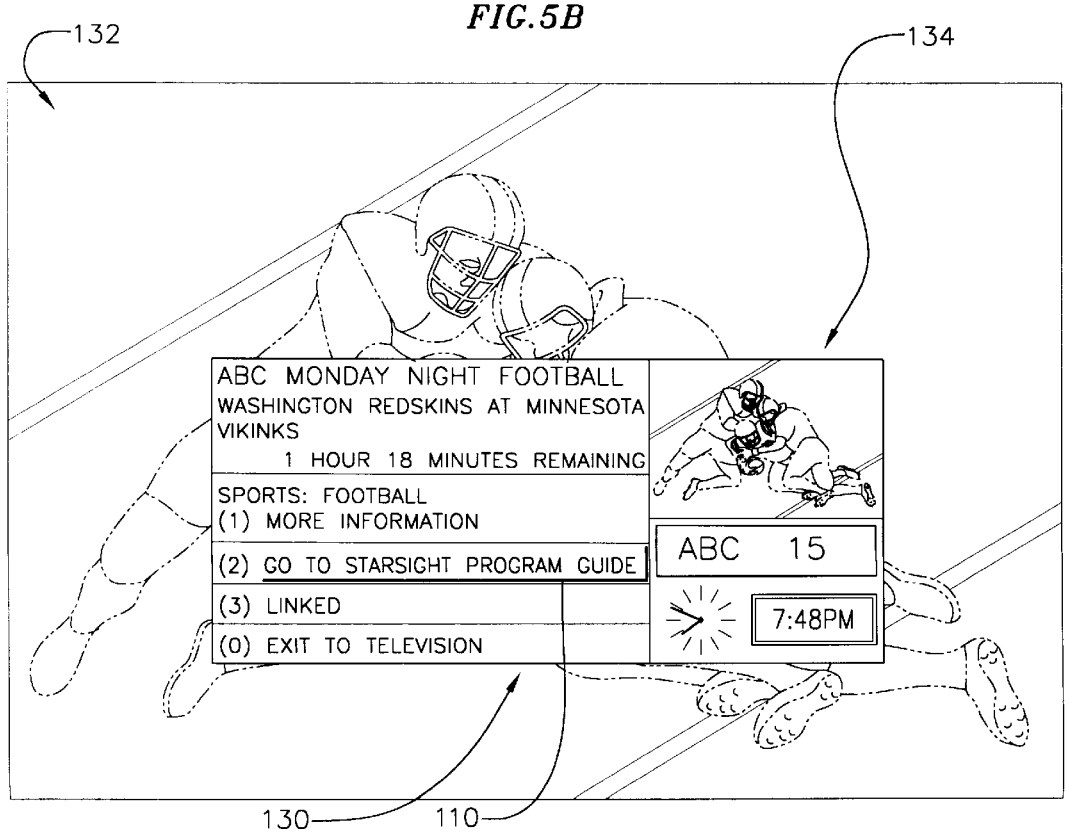
Figure 5C:
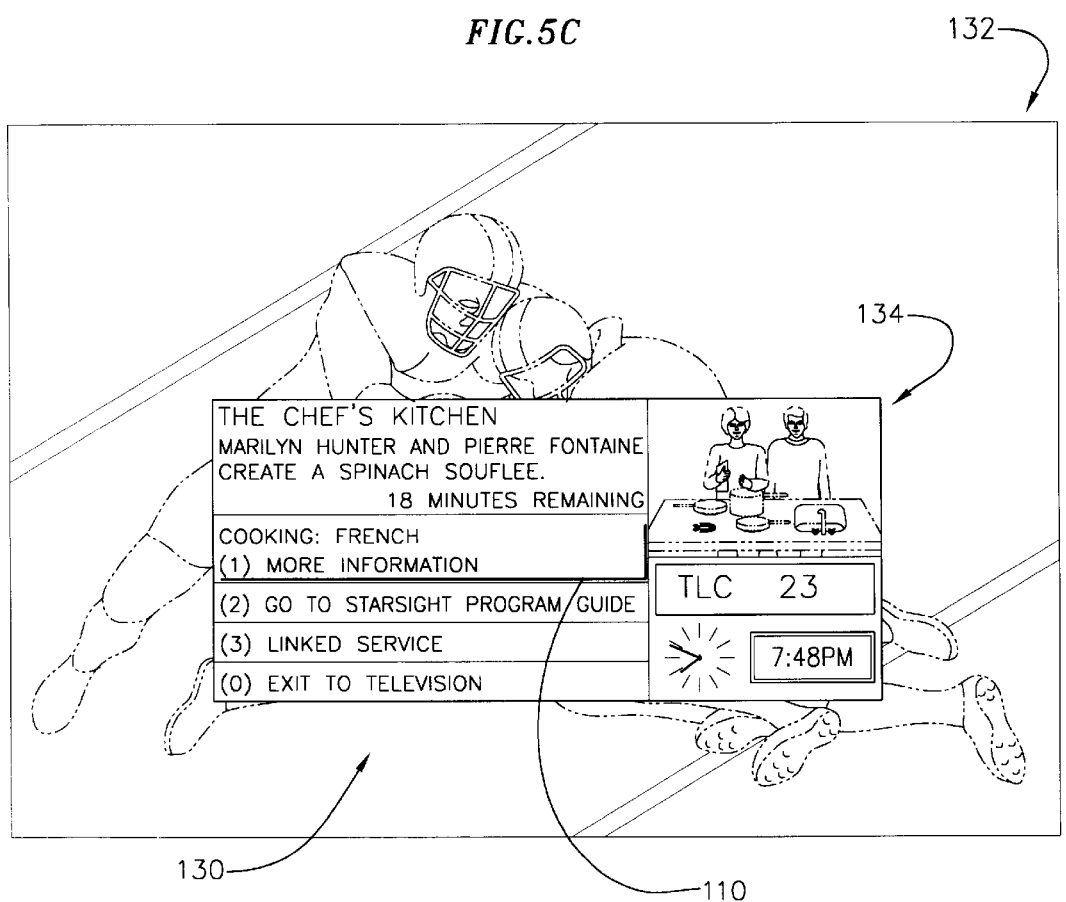

A method according to the present invention for using a television schedule system with remote control device 2 will now be described. FIGS. 5A–5C illustrate a method of accessing program guide 102 from a currently tuned program and browsing through other currently tuned programs with remote control device 2. As shown in FIG. 5A, the viewer is watching a television show on a display screen 132, such as a Monday Night Football game featuring the Washington Redskins versus the Minnesota Vikings. Clicking on rolling cylinder 24 automatically causes a Program InfoMenu 130 to pop up on a portion of the television screen 132 (see FIG. 5B). Program InfoMenu 130 may allow the viewer to obtain more information about the currently tuned program, move to program guide 102, move to contextual linked services (discussed below), or exit InfoMenu 130 back to the television show. The viewer may vertically scroll through these options by rotating cylinder 24 upwards or downwards, and select one of the options by clicking on cylinder. For example, clicking on the "Go to program guide" section immediately transfers the viewer to the program guide, as shown in FIG. 4A.

To browse other currently tuned programs, the viewer employs the channel controls (i.e., function buttons 10, see FIG. 1). This allows the viewer to browse through other information menus while viewing the currently tuned program (see FIG. 5C). Alternatively, clutch button 46 may be depressed to switch the modality of local controller 20 and allow the viewer to browse through the channels with cylinder 24. This allows the viewer to browse without taking his or her thumb off cylinder 24 and without looking at remote control device 2. In an exemplary configuration, InfoMenu 130 includes a browsing window 134 that displays ("live") the program in InfoMenu (FIG. 5C). This feature allows the viewer to actually view the programs as he/she browses through them. A single click of cylinder 24 would take the viewer to the browsed program. The remote control device may also include means for switching the sound between the currently tuned program and the program in the browsing window 134.

Figure 6A:
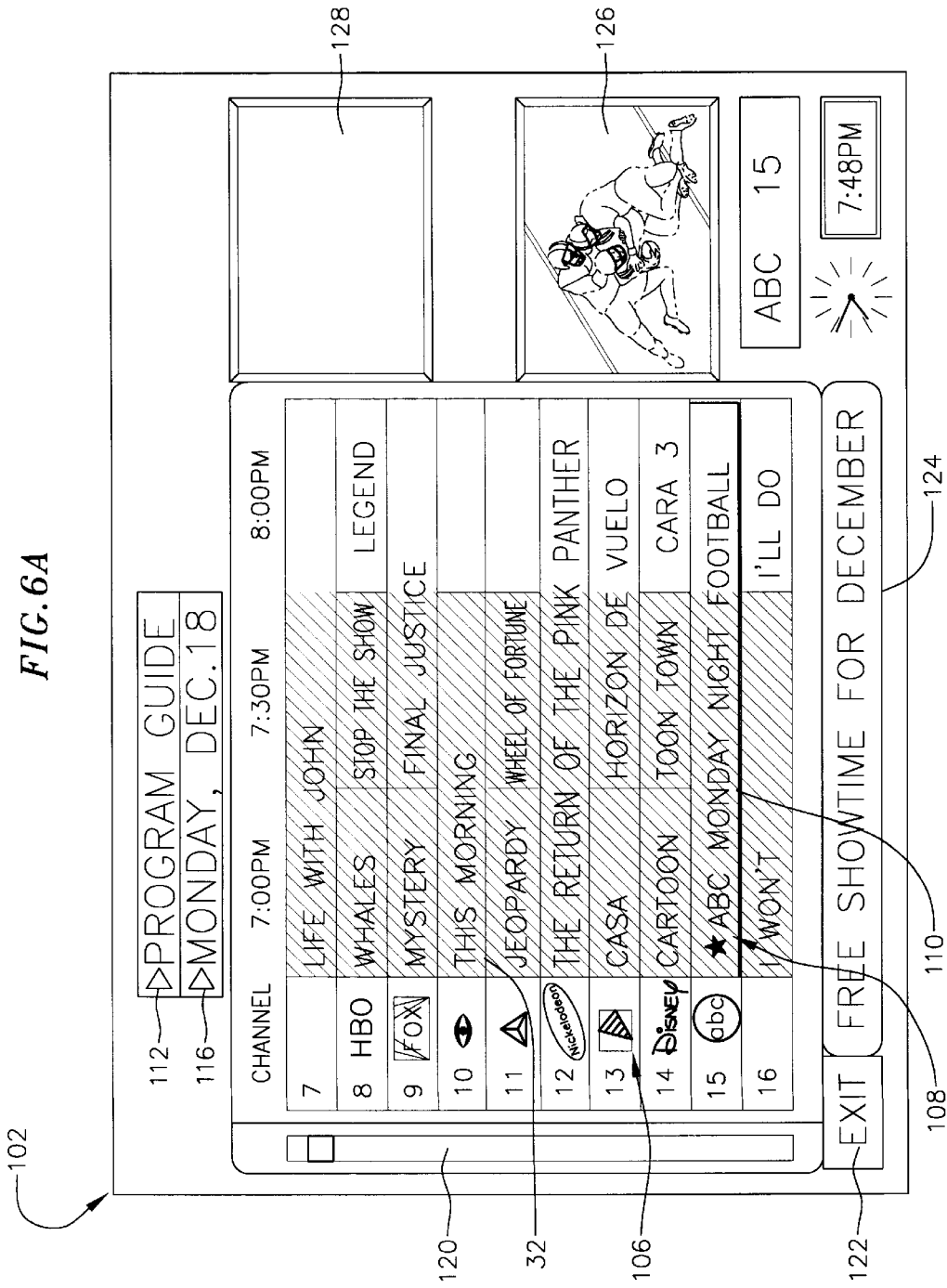
Figure 6B:
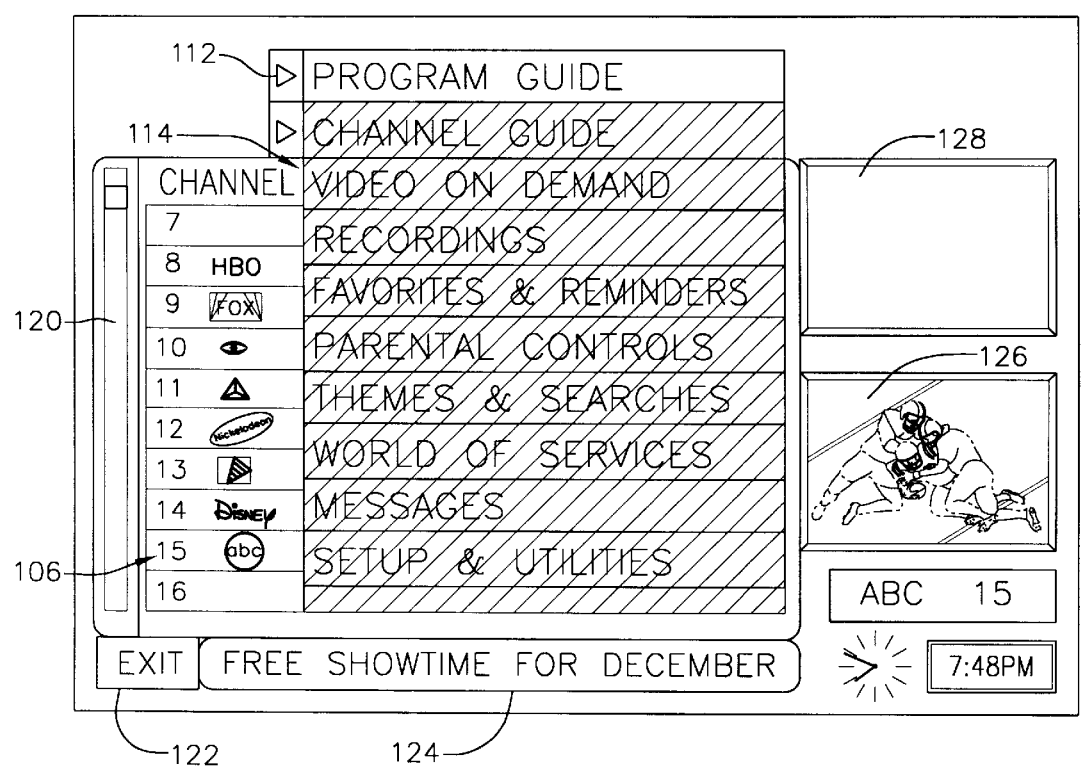
Figure 6C:
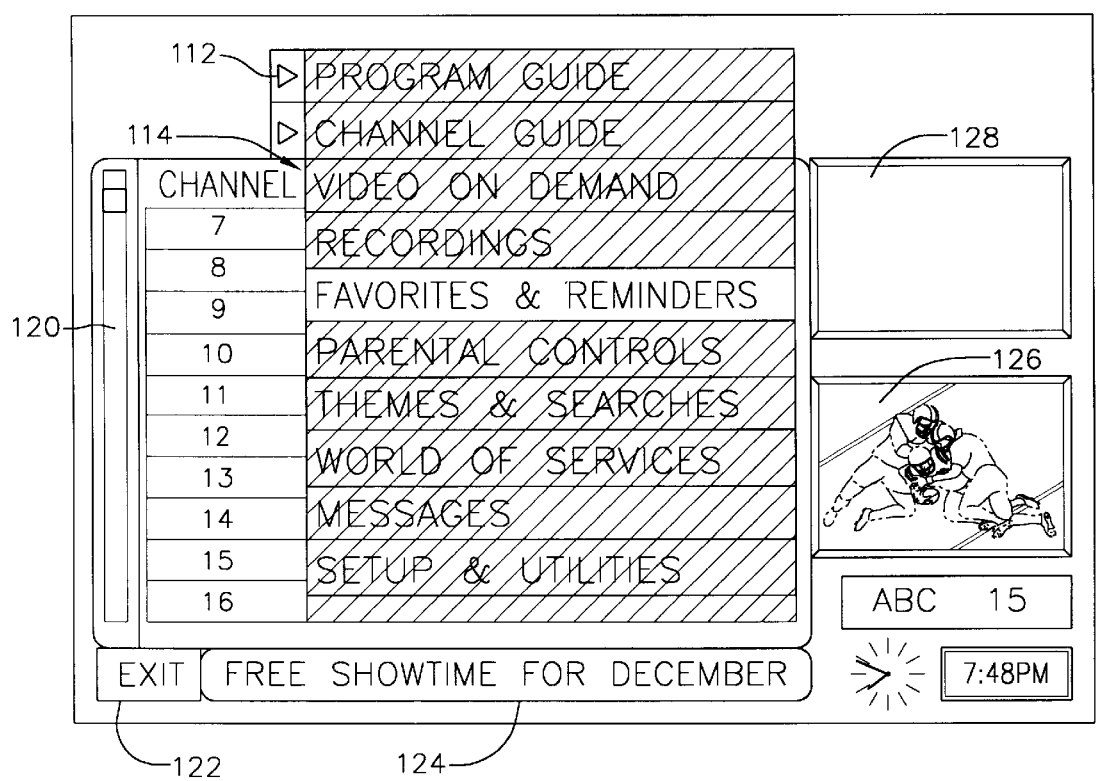

FIGS. 6A–6D illustrate a method for changing the mode of the representative television schedule system. As shown in FIG. 5A, the viewer starts in program guide 102, which can be accessed through the Infomenu 130 of the currently tuned program as discussed above or by double clicking on cylinder 24 from the television screen (which will automatically select the default item within the Infomenu). To navigate to the Mode Menu, the viewer presses twice on the upper button 42 of global controller 22. This moves the viewer through date submenu 116 to the mode menu area 112. As shown in FIG. 5B, mode menu 114 automatically pulls down, allowing the viewer the use cylinder 24 to scroll up and down the list of modes and to click on a menu item to select a different mode. For example, if the viewer wishes to see the Favorites and Reminders Menu 158, the viewer clicks on "Favorites and Reminders" and moves to this mode, as shown in FIG. 6D. Note that the design of viewer input device 6 allows the viewer to easily scroll through the various menus of the program guide without looking at remote control device 2. In addition, the viewer can access various modes and scroll through the different menus simply by using his or her thumb.

Figure 7A:
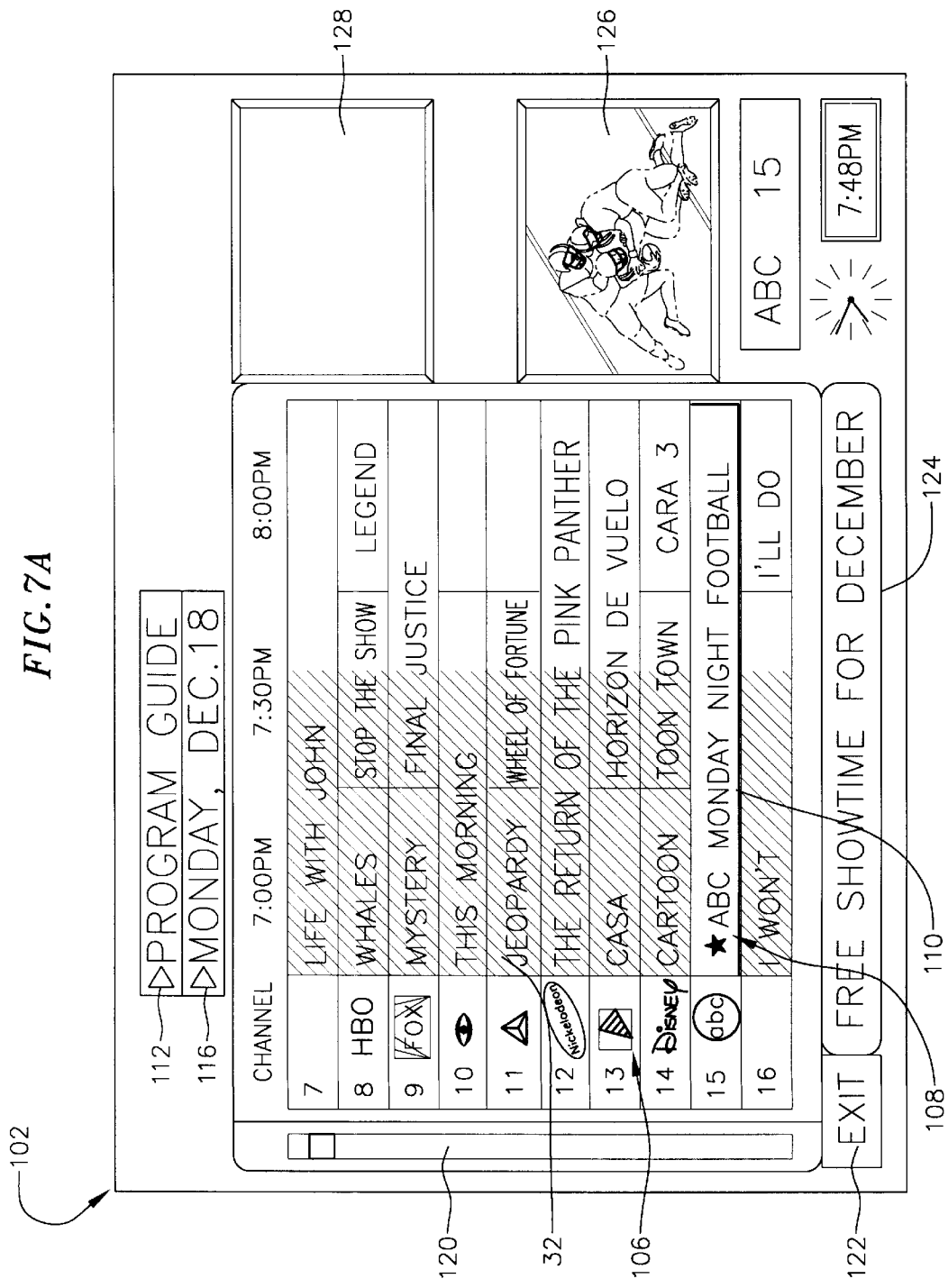
Figure 7B:
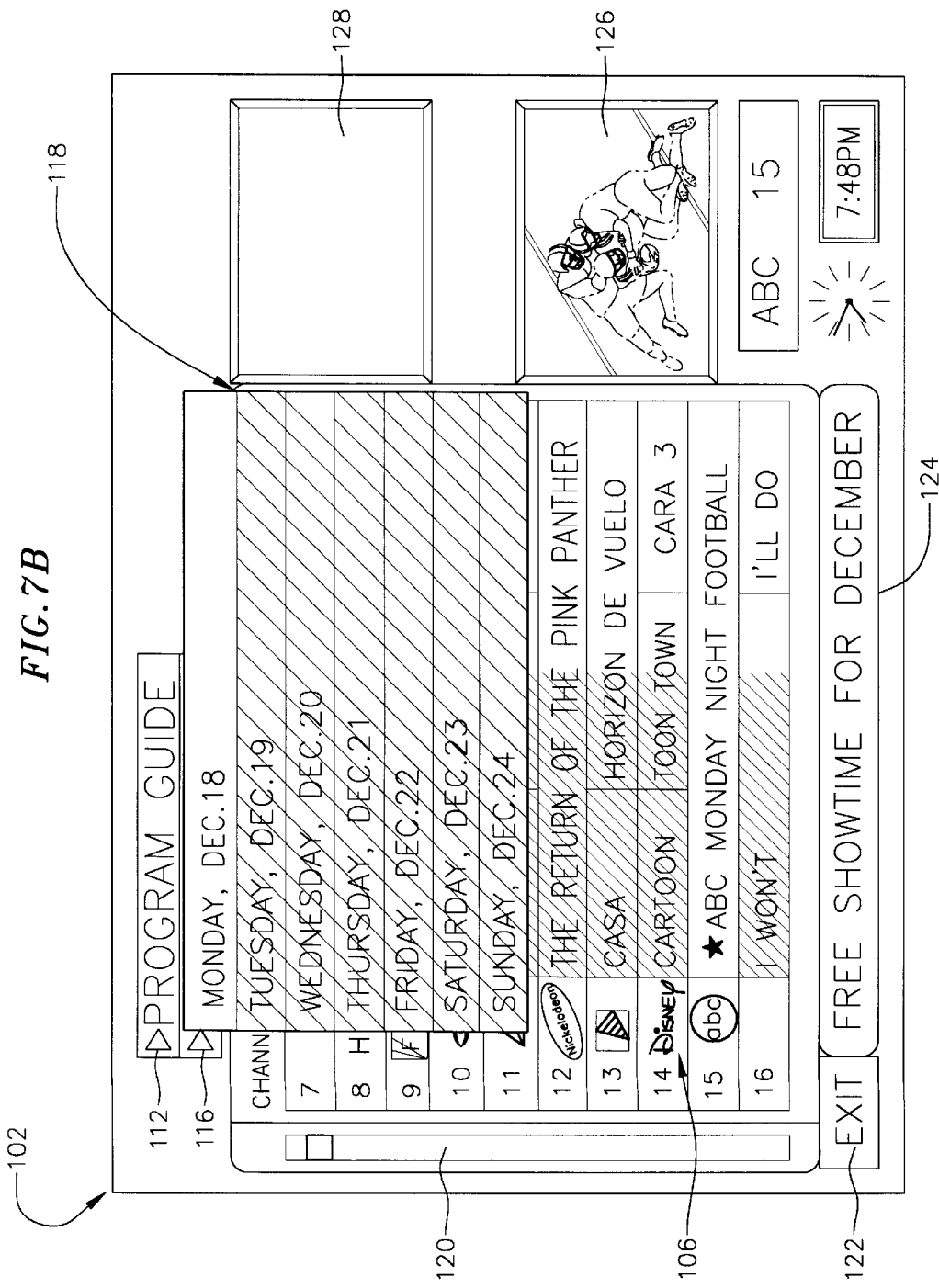
Figure 7C:
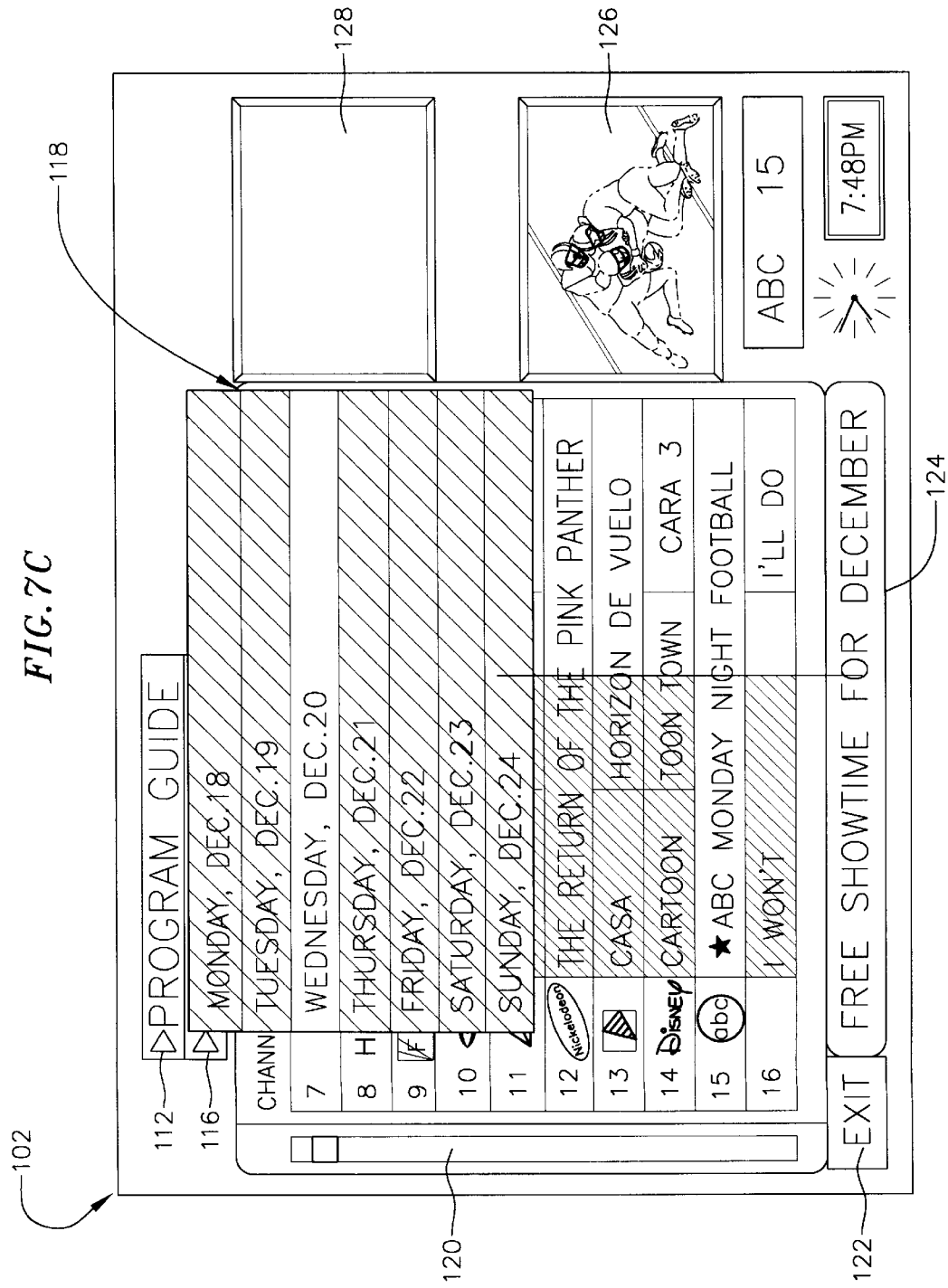

FIGS. 7A–7D depict a method of navigating to a submode menu with the program guide 102. One of the advantages of the television schedule system of the present invention is that the submode menus dynamically change depending on the Mode. For example, if the viewer desires to view the programs on a different day (other than the current day), he or she navigates to date area 116 by pressing once on upper button 42 of global controller 22. This moves the viewer to date area 116, where a submode menu 118 automatically scrolls down, as shown in FIG. 7B. The viewer may then scroll through the days of the week with rolling cylinder 24, which will become highlighted as the cursor moves through each day. To select another date, the viewer simply clicks on cylinder 24 and program matrix 106 jumps forward to another day, for example, Wednesday, as shown in FIG. 7D.

Figure 8B:
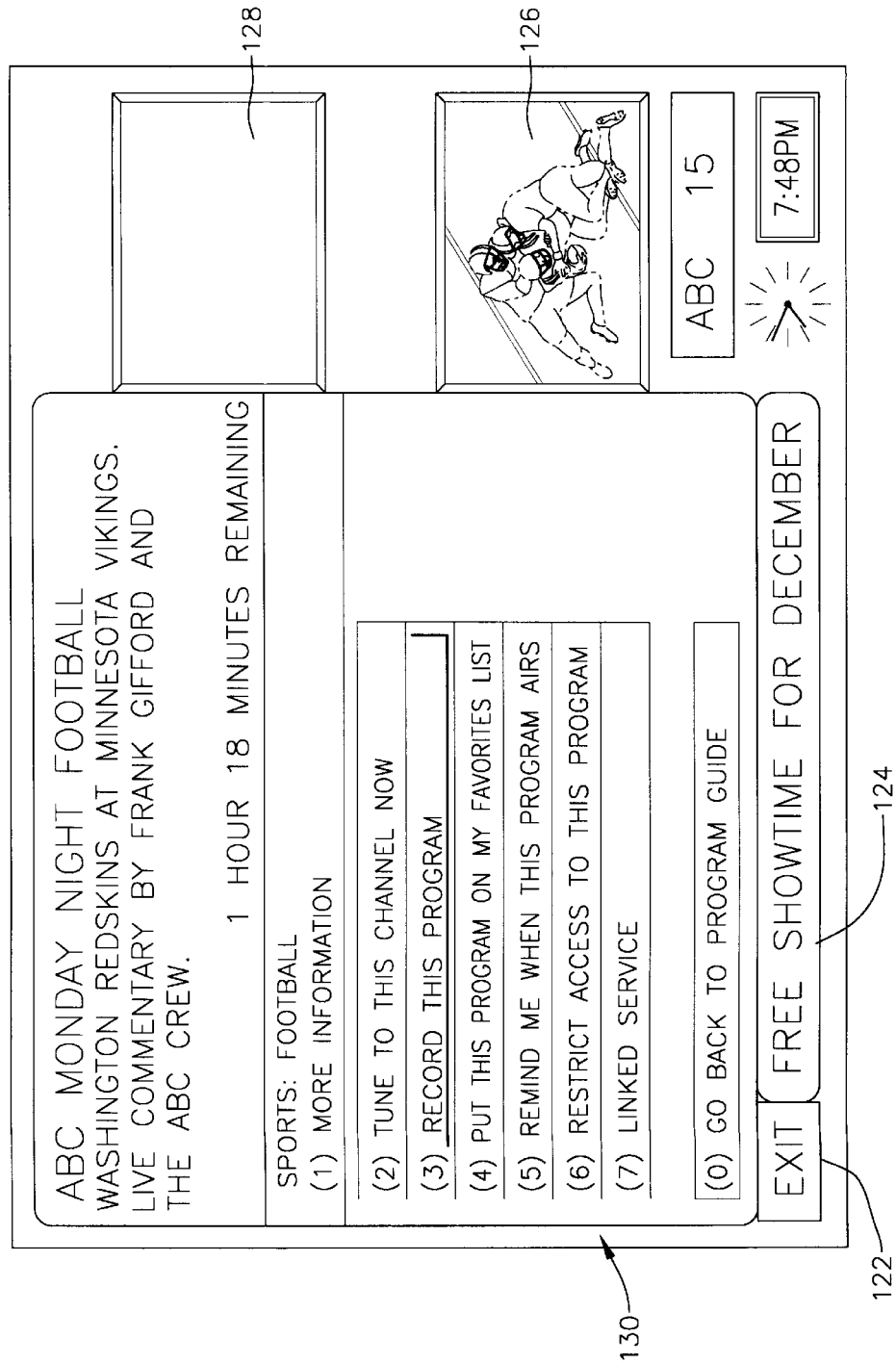

FIGS. 8A–8D illustrate a method of opening up Item InfoMenus with remote control device 2. As the viewer is scrolling around program matrix 106, clicking cylinder 24 on a selected item will open up its InfoMenu 130, as shown in FIG. 8B. The InfoMenu 130 is a gateway to information about programs and items and services linked to them. For example, the viewer may scroll down InfoMenu 130 to the item "record this program". Once the item is selected, the viewer simply clicks once on cylinder 24 and a record submenu 152 appears where the viewer can specify how this program is to be added to the recording list (see FIG. 8C). The viewer can scroll up and down record submenu 152 with cylinder 24 and click on the desired choice. If the viewer scrolls up on the InfoMenu 130 instead of down, the info item will highlight in yellow and expand downward to review additional information about the program item, as shown in FIG. 8D. This expanded info item 154 will collapse automatically when the viewer scrolls downward with cylinder 24.

The system and method of the present invention may be configured to automatically or manually customize the television schedule guide to an individual viewer or a group of viewers, e.g., a family. In this embodiment, the remote control device may be used to select certain programs, and a memory stores the television programs that have been selected by the viewer. The programs can be selected for a variety of reasons, such as a designated the program as a favorite, placing a reminder to watch the program or, when the television schedule system includes a recording device, placing an automatic reminder to the program guide to record the program. In a specific configuration, the system further includes a visual display, such as a physical icon within the cell, for indicating that a program has been selected. In addition, the program guide includes a selection window that displays some or all of the programs that have been selected by the viewer. The input device will allow the viewer to activate and deactivate the selection window, and to move between each program within the selection window and activate programs to obtain information associated with the selected program.

In an exemplary embodiment, the system includes a database containing each program within the television schedule. The database may be included within a computer integrally combined with the television (e.g., PCTV), a computer that is coupled to the television through suitable lines, or the database may be accessed from a remote computer, e.g., via the internet or other communication medium. Within the database, each program is associated with a variety of criteria or features, such as particular actors, actresses, directors, the type of movie (e.g., action, comedy) and the like. When the viewer selects a program as a favorite, for example, he or she will have the option of designating the criteria or reason(s) that the program is a favorite (i.e., actor, director, etc.). The computer will include a processor and suitable software for automatically searching the database for other programs having the same criteria. The processor will automatically place the programs that include the designated criteria into the selection window and provide visual indication of each program in the matrix of cells in the program guide. In this way, the program guide will automatically customize itself to the individual viewer to facilitate use of the television schedule.

Figure 9D:
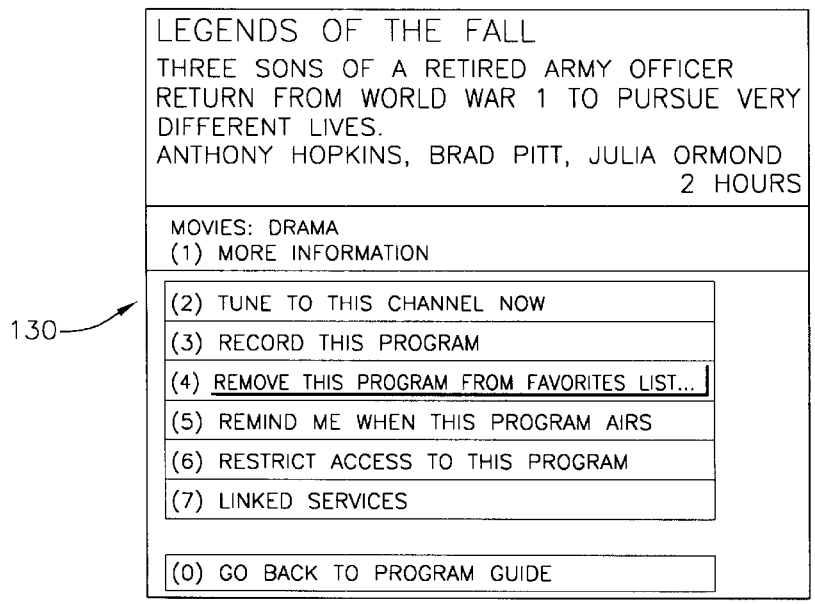
Figure 9E:
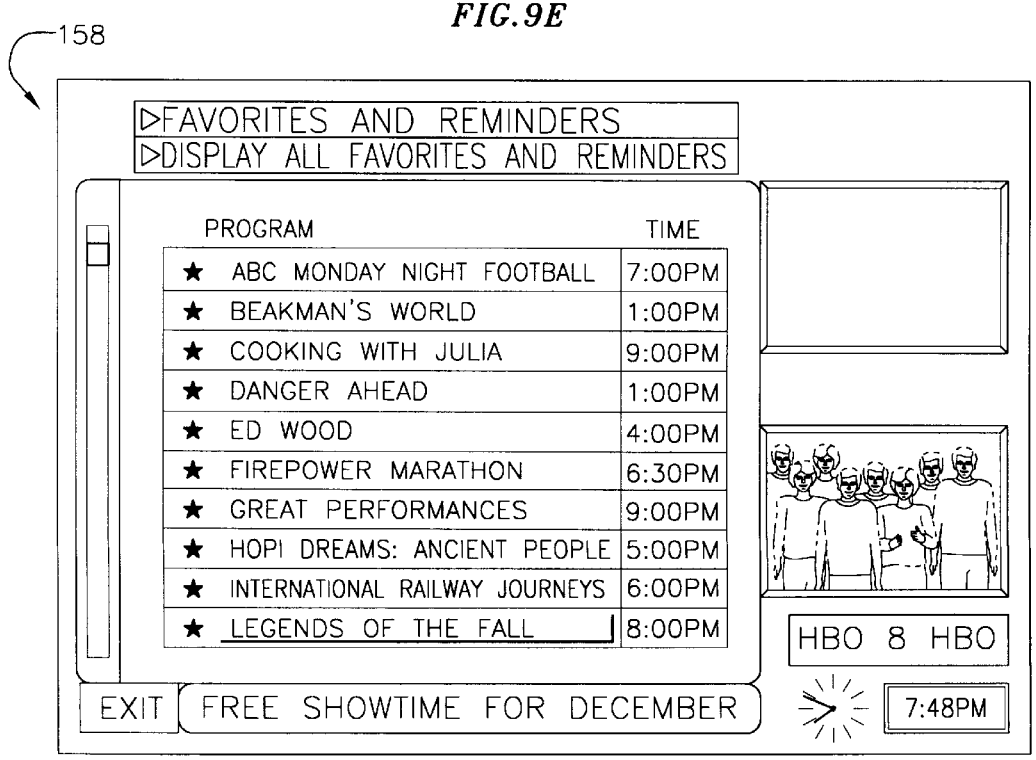

FIGS. 9A–9F illustrate a method of utilizing remote control device 2 for designating a program as a favorite. For example, an Item InfoMenu 130 is opened and the viewer scrolls down to section (4), and selects "Put this program on my favorite list" by clicking cylinder 24. A Favorites submenu automatically appears with a panel asking the viewer why this program has been shown as a favorite. For example, FIG. 9B illustrates a Favorites submenu 155 for a sitcom or program and FIG. 9C illustrates a submenu 156 for a movie. Other types of programs will have other unique submenus. The viewer is given a choice to scroll down to choose reasons for selecting the program as a favorite, such as performers, categories, series as a whole, etc. This feature could also be utilized to allow the viewer to go to the database of his or her preferences. It would then be possible to link to other programs with matching criteria, thereby allowing the viewer to customize the system to his or her needs. For example, if the viewer selects "performers" (see FIG. 9C), this would bring up a listing of known performers (or a similar appropriate listing) in this program. The viewer than identifies which ones are favorites. After specifying the criteria for being a favorite, a confirmation panel (not shown) may appear that allows the viewer to o.k. the action. When the viewer returns to the Items Info Menu, a favorite symbol has been added to the title and menu item (4) now gives the option to remove the program from the favorites list (see FIG. 9D). This cursor functionality is found throughout this system and is the easiest way to add or remove items from the list. After the program has been selected as a favorite, it is added to the Favorites and Reminders list 158, as shown in FIG. 9E. The system will then automatically search the guide to determine which programs include the specified performers. In addition, the system may be configured to continuously perform this search as new programs appear in the guide each day.

Henceforth, some or all program items containing the viewer's specified performers would be marked with a star and appear on the "favorites" list.

Figure 10A:
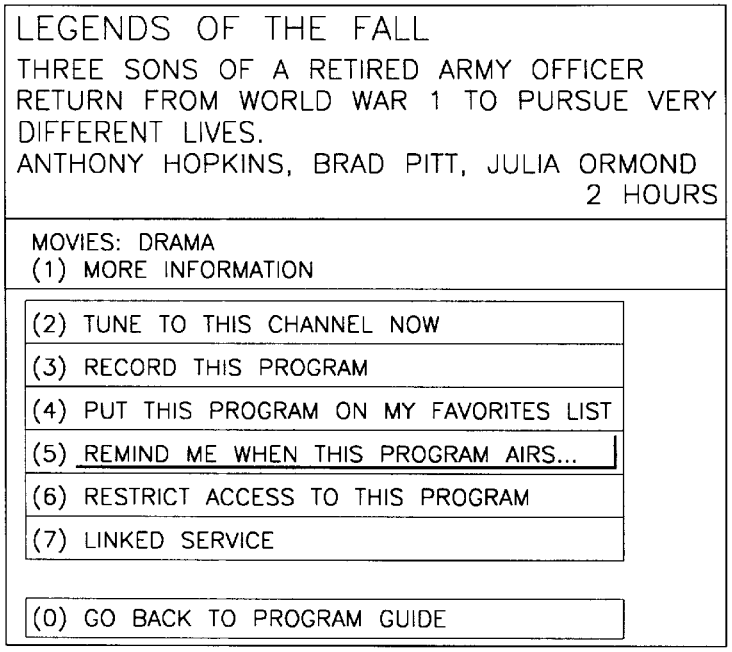
FIGS. 10A–10D illustrate a method for selecting a program reminder.
Figure 10B:
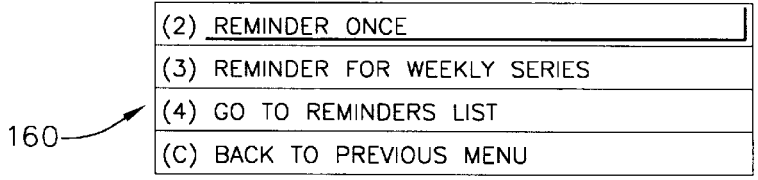
Figure 10C:
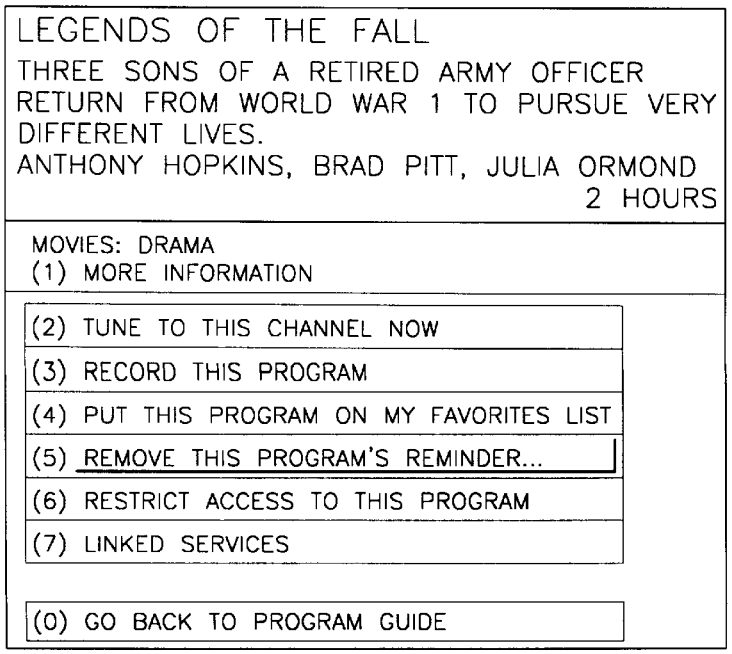
Figure 10D:
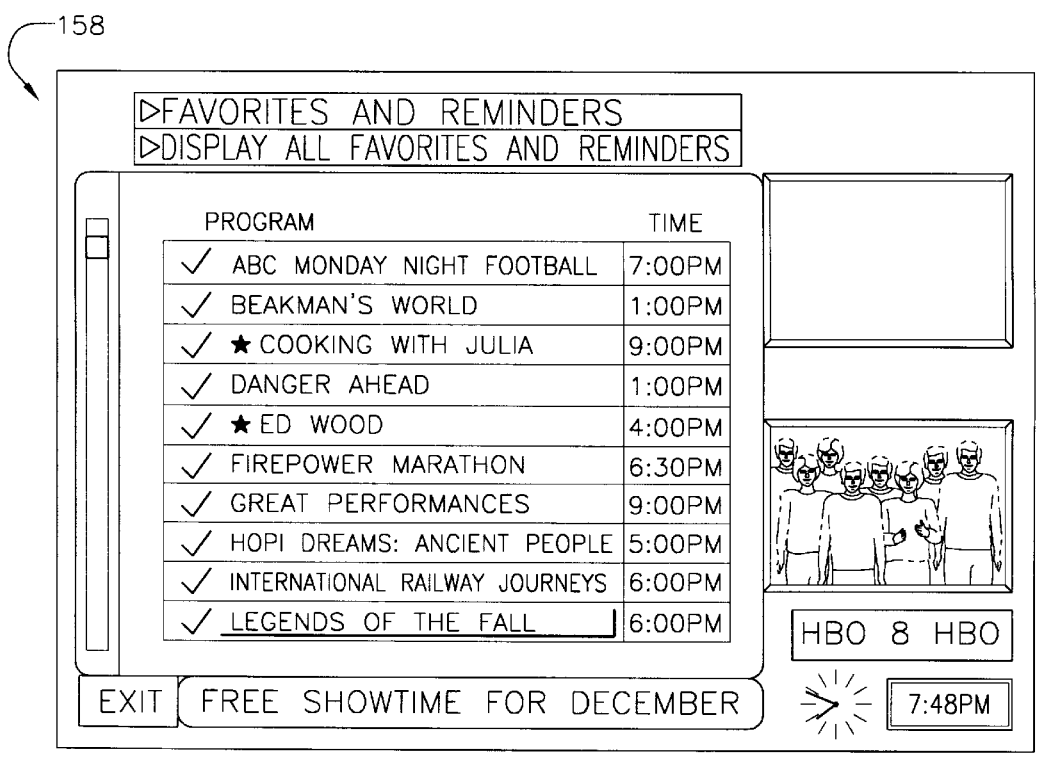

FIGS. 10A–10D illustrate a method for utilizing television schedule system to create a program reminder. Similar to the "favorites" method discussed above, an Item's InfoMenu 130 is opened and the viewer scrolls down to item (5) "Reminding when the program airs" and selects this item by clicking cylinder 24. A reminder submenu 160 is then activated to provide the viewer with various items for the times and number of reminders, as shown in 10B. This reminder submenu 160 can vary depending on the program's type or scheduling configuration. After specifying the recording option, a confirmation panel (not shown) will appear, allowing the viewer to o.k. the action. When the viewer has returned to the Item's InfoMenu 130 (see FIG. 10C), a reminder symbol has been added to the title and menu item (5) now gives the option to remove the program's reminder. After the program is scheduled for reminder, it is added to the "Favorites and Reminder" list, as shown in FIG. 10D.

Figure 11A:
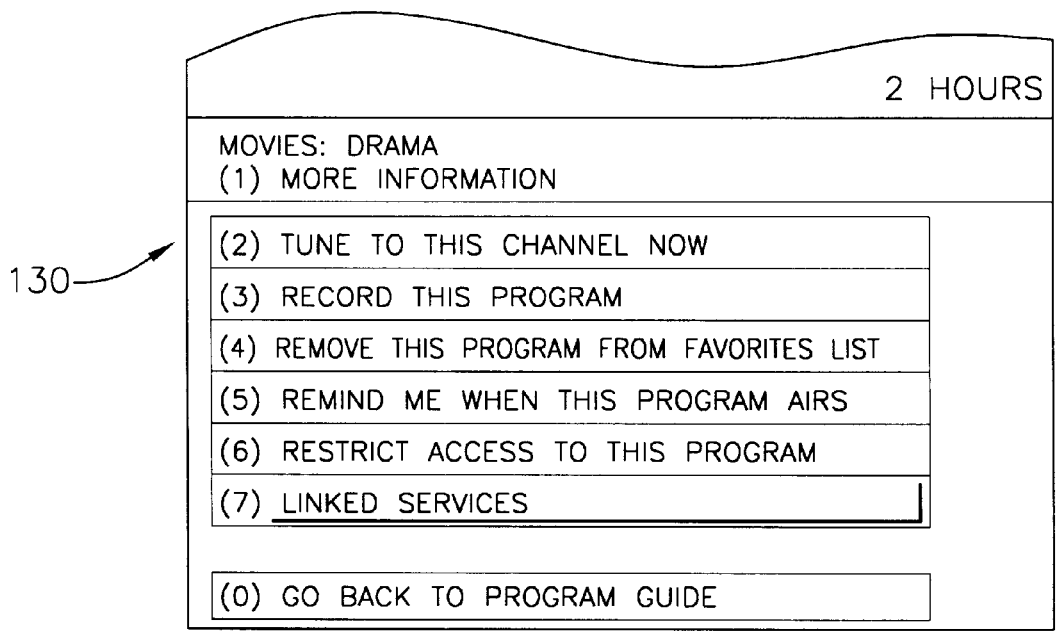
Figure 11B:
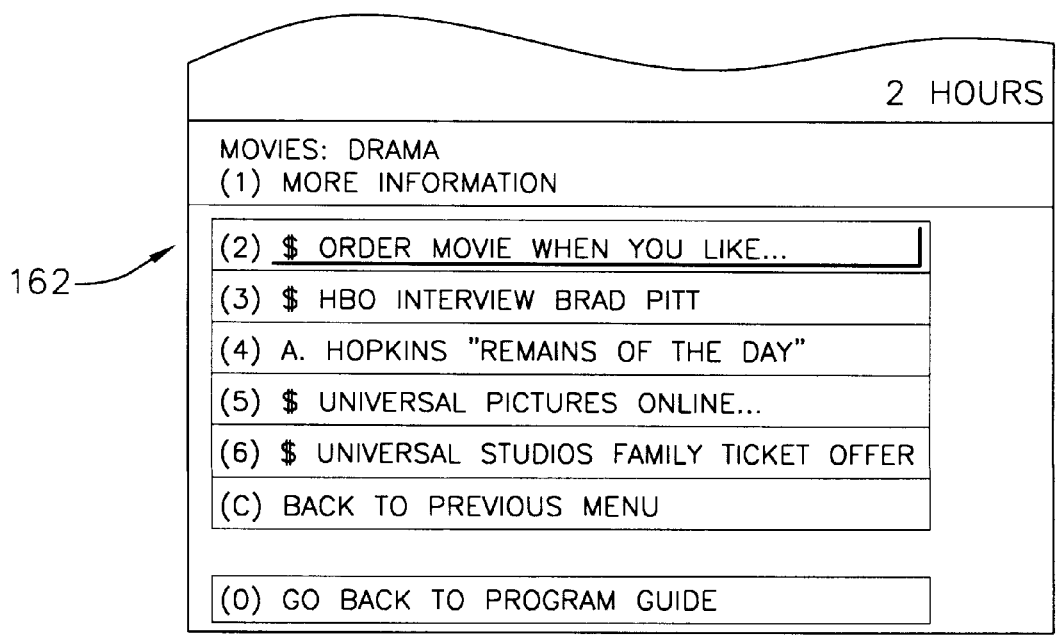

FIGS. 11A–11E illustrate a method of ordering video on demand with remote control device 2. As shown in 10A, the viewer opens up the program's InfoMenu 130 and thumb scrolls down to the "order videos" item and clicks on cylinder 24. The viewer is then presented with an easily scrollable matrix or menu (not shown) of movies or other programs that may be ordered. To facilitate this process, the system may include a text or feature searching program that allows the user to search for a particular movie, a particular type of movie, movies having a certain actor or actress, etc. Once a program has been selected, the viewer will be taken to a menu 162 associated with this program, as shown in FIG. 11B. The menu will allow the viewer to directly order the program, or order other programs, such as interviews, specials, etc., that are associated with the program. Some, denoted with a dollar sign, are purchasable. Free items would be instantly accessible to the viewer. The viewer may be prompted to a simple procedure to specify when the movie is to be delivered. When the viewer selects a particular program requiring a financial transaction, a purchasing sequence unfolds. As shown in FIG. 11C, the viewer is prompted to enter the master password/access code via the remote keypad or other means. For example, the viewer could swipe his or her credit card through slot 60 (FIG. 1). If the password/access code is accepted, the viewer is given a final opportunity to review the purchase and/or either confirm or return to the previous item menu (see FIG. 11D). When the viewer confirms his or her purchase and/or order, a receipt 170 is shown (FIG. 1E). The viewer is given the choice of returning to the previous item menu or, as always, at the very bottom item "0", to return to the program guide.

Although the foregoing invention has been described in detail for purposes of clarity, it will be obvious that certain modifications may be practiced within the scope of the appended claims. For example, remote control device 2 may be configured with a variety of shortcuts to expedite the viewer's navigation through a television schedule system. A viewer may use horizontal buttons 32, 34 of local controller 20 to collapse a submenu backwards. In addition, the remote control device 2 may have a physical "exit" button (not shown) to allow the viewer to immediately return to the television show from whatever menu or submenu the viewer was in prior to clicking this button. In another embodiment, navigation ring 40 will be configured so that pressing any of the buttons 42 on ring 40 will collapse any info menu back to its source. This is a shortcut for scrolling down and selecting the "back to previous menu" item.

Remote control device 2 may also be useful for sorting, mixing and preparing a special customized line-up of channels within program guide 102. In addition, the viewer can automatically tune to a desired program or can select different programs for automatic recording. A detail description of suitable systems for automatic tuning and automatic recording can be found in commonly assigned U.S. Pat. No. 4,706,121 and application Ser. No. 08/423,411, the complete disclosure of which is incorporated herein by reference.

What is claimed is:

1. A remote control device for use with a television having a display for presenting information to a viewer in a plurality of different screen areas, the remote control device comprising:

a casing having an exterior surface;

a viewer input assembly located on the exterior surface of the casing, the viewer input assembly including a controller having a first scroll mechanism adapted for displacing a movable cursor within each screen area and a second scroll mechanism adapted for displacing a movable cursor between the plurality of different screen areas on the television display; and a transmitter within the casing for transmitting signals from the viewer input assembly; and wherein actuation of the first scroll mechanism causes the cursor to move in X and Y directions within each screen area on the television display and actuation of the second scroll mechanism causes the curser to move in the X and Y directions between the plurality of different screen areas on the television display.

2. A remote control device for navigating a television screen having a plurality of different screen areas for displaying different information, the remote control device comprising:

a casing having an exterior surface;

an input assembly located on the exterior surface of the casing, the input assembly including a local controller having a first scroll mechanism for displacing a movable cursor within each screen area and a global controller having a second scroll mechanism for displacing the cursor between the plurality of different screen areas wherein, each of the first and the second scroll mechanisms adapted for displacing the cursor in a X direction and a Y direction on the television screen; and a transmitter within the casing for transmitting signals from the input assembly.

3. The remote control device of claim 2 wherein the cursor is a physical icon.

4. The remote control device of claim 2 wherein the cursor is represented by highlighting a portion of the television screen.

5. The remote control device of claim 2 wherein the first scroll mechanism includes a rotatably mounted vertical scroll mechanism for moving the cursor in a Y direction within a screen area and a horizontal scroll mechanism for moving the cursor in a X direction within a screen area.

6. The remote control device of claim 5 wherein the vertical scroll mechanism includes a selector switch for selecting an item on the television screen when the cursor is contiguous with said item.

7. The remote control device of claim 5 wherein one of the plurality of different screen areas comprises a matrix of cells, the vertical scroll mechanism scrolling the cursor in the Y direction through the cells within the screen area.

8. The remote control device of claim 5 wherein one of the plurality of different screen areas comprises a matrix of cells, the horizontal scroll mechanism scrolling the curser in the X direction through the cells within the screen area.

9. The remote control device of claim 5 wherein the casing defines a longitudinal axis, the vertical scroll mechanism comprising a thumb-operated cylinder rotatably mounted to the exterior surface of the casing about an axis substantially perpendicular to the longitudinal axis of the casing.

10. The remote control device of claim 9 wherein the horizontal scroll mechanism comprises one or more thumb-operated buttons adjacent to the cylinder for scrolling the cursor in the X direction.

11. The remote control device of claim 10 wherein the horizontal scroll mechanism comprises a pair of opposing buttons symmetrically located about the cylinder each button for scrolling the curser in the X-direction.

12. The remote control device of claim 2 further comprising:
   a microphone for receiving spoken commands from a user;
   a voice recognition device for converting the spoken commands into signals for transmission; and
   a trigger switch for activating or deactivating the microphone.

13. The remote control device of claim 5 wherein the horizontal scroll mechanism comprises at least one thumb-operable button.

14. The remote control device of claim 2 wherein the local controller and the global controller further comprise means for providing tactile feedback to a user corresponding to movement of the curser on the television screen.

15. The remote control device of claim 14 wherein the tactile feedback means comprises one or more detents positioned adjacent to the controller for providing tactile sensations to the user that correspond to movement of the cursor.

16. The remote control device of claim 2 wherein the global controller comprises an annular ring surrounding the local controller, the ring having a plurality of thumb-operated direction buttons configured such that pressing one of the direction buttons moves the cursor to one of the screen areas in a direction corresponding to the location of the pressed button.

17. The remote control device of claim 2 further comprising a clutch button located on the exterior surface of the casing, wherein pressing the clutch button alternates the remote control device between a local mode, in which the cursor is movable within one of the screen areas, and a global mode, in which the cursor is movable between the screen areas.

18. A method of navigating a television screen having a plurality of screen areas comprising the steps of:
   manipulating a local controller on a remote control device having a first scroll mechanism to generate signals for displacing a movable cursor within each screen area;
   manipulating a global controller on a remote control device having a second scroll mechanism to generate signals for displacing the cursor between the plurality of screen areas wherein, each of the first and the second scroll mechanisms adapted for displacing the cursor in a X direction and a Y direction on the television screen;
   remotely transmitting the generated signals; and
   displacing the movable cursor on the screen in response to the transmitted signals.

19. The method of claim 18 further comprising the steps of:
   activating a microphone;
   receiving spoken commands from a user via the microphone; and
   converting the spoken commands into signals for transmission.

20. The method of claim 18 further comprising the step of providing tactile feedback to the viewer corresponding to movement of the curser on the screen.

21. A television schedule system comprising:
   a television including a screen having a plurality of screen areas for displaying information;
   a television program guide displayed in one of the plurality of screen areas for displaying television schedule information; and
   an input device for inputting user commands, the device including a local controller having a first scroll mechanism for displacing a movable cursor within each screen area and a global controller having a second scroll mechanism for displacing the cursor between the plurality of screen areas wherein, each of the first and the second scroll mechanisms adapted for displacing the cursor in a X direction and a Y direction on the television screen.

22. The television schedule system of claim 21 further comprising:
   a microphone for receiving spoken commands from a user;
   a voice recognition device for converting the spoken commands into signals for transmission; and
   a trigger switch for activating or deactivating the microphone.

* * * * *